United States Patent
Cheiky et al.

(10) Patent No.: US 8,568,493 B2
(45) Date of Patent: Oct. 29, 2013

(54) METHOD FOR PRODUCING NEGATIVE CARBON FUEL

(75) Inventors: Michael Cheiky, Thousand Oaks, CA (US); Ronald A. Sills, Houston, TX (US)

(73) Assignee: Cool Planet Energy Systems, Inc., Camarillo, CA (US)

( * ) Notice: Subject to any disclaimer, the term of this patent is extended or adjusted under 35 U.S.C. 154(b) by 0 days.

(21) Appl. No.: 13/189,709

(22) Filed: Jul. 25, 2011

(65) Prior Publication Data
US 2013/0025190 A1    Jan. 31, 2013

(51) Int. Cl.
C10L 1/18    (2006.01)

(52) U.S. Cl.
USPC .......... 44/628; 44/447; 44/448; 44/451; 44/605

(58) Field of Classification Search
USPC .......... 44/388, 447, 448, 628, 605, 451
See application file for complete search history.

(56) References Cited

U.S. PATENT DOCUMENTS

| | | | |
|---|---|---|---|
| 203,016 A | 4/1878 | Edison | |
| 222,390 A | 12/1879 | Edison | |
| 474,230 A | 5/1892 | Edison | |
| 4,268,275 A | 5/1981 | Chittick | |
| 4,421,524 A | 12/1983 | Chittick | |
| 4,487,958 A | 12/1984 | Ream et al. | |
| 4,497,637 A | 2/1985 | Purdy et al. | |
| 4,530,702 A | 7/1985 | Fetters et al. | |
| 4,861,351 A | 8/1989 | Nicholas et al. | |
| 4,992,480 A | 2/1991 | Mahajan et al. | |
| 5,032,618 A | 7/1991 | Marchionna et al. | |
| 5,087,786 A | 2/1992 | Nubel et al. | |
| 5,221,290 A | 6/1993 | Dell | |
| 5,504,259 A | 4/1996 | Diebold et al. | |
| 5,756,194 A | 5/1998 | Shogren et al. | |
| 5,820,640 A * | 10/1998 | Ikura et al. | 44/301 |
| 5,857,807 A | 1/1999 | Longo | |
| 6,133,328 A | 10/2000 | Lightner | |
| 6,227,473 B1 | 5/2001 | Amoki | |
| 6,339,031 B1 | 1/2002 | Tan | |
| 6,548,026 B1 | 4/2003 | Dales et al. | |
| 6,747,067 B2 | 6/2004 | Melnichuk et al. | |
| 6,811,703 B2 | 11/2004 | Elliott | |

(Continued)

FOREIGN PATENT DOCUMENTS

| | | |
|---|---|---|
| KR | 100819505 | 3/2008 |
| WO | WO 2009004652 | 1/2009 |

OTHER PUBLICATIONS

Faludi, Jeremy, World Changing Change Your Thinking a Carbon-Negative Fuel; Oct. 16, 2007 http://www.worldchanging.com/archieves/007427.html.*

(Continued)

*Primary Examiner* — Cephia D Toomer
(74) *Attorney, Agent, or Firm* — Wilmer Cutler Pickering Hale and Dorr LLP

(57) ABSTRACT

A method and process is described for producing negative carbon fuel. In its broadest form, a carbon-containing input is converted to combustible fuels, refinery feedstock, or chemicals and a carbonaceous solid concurrently in separate and substantially uncontaminated form. In an embodiment of the invention, biomass is converted via discrete increasing temperatures under pressure to blendable combustible fuels and a carbonaceous solid. The carbonaceous solid may be reacted to synthesis gas, sold as charcoal product, carbon credits, used for carbon offsets, or sequestered.

13 Claims, 16 Drawing Sheets

(56) References Cited

U.S. PATENT DOCUMENTS

| | | | |
|---|---|---|---|
| 6,841,085 B2 | 1/2005 | Werpy et al. | |
| 6,923,838 B2* | 8/2005 | Maubert et al. | 44/308 |
| 6,994,827 B2 | 2/2006 | Safir et al. | |
| 7,033,972 B2 | 4/2006 | Shikada et al. | |
| 7,226,566 B2 | 6/2007 | Beierle | |
| 7,458,999 B2* | 12/2008 | Schenck et al. | 44/605 |
| 7,846,979 B2 | 12/2010 | Rojey et al. | |
| 7,888,540 B2 | 2/2011 | Deluga et al. | |
| 2003/0119952 A1 | 6/2003 | Werpy et al. | |
| 2004/0111968 A1 | 6/2004 | Day et al. | |
| 2008/0006519 A1 | 1/2008 | Badger | |
| 2008/0093209 A1 | 4/2008 | Noto | |
| 2008/0216391 A1 | 9/2008 | Cortright et al. | |
| 2008/0223269 A1 | 9/2008 | Paoluccio | |
| 2008/0300435 A1 | 12/2008 | Cortright et al. | |
| 2008/0317657 A1 | 12/2008 | Haii et al. | |
| 2009/0007484 A1 | 1/2009 | Smith | |
| 2009/0139139 A1* | 6/2009 | Tilman et al. | 47/58.1 R |
| 2009/0151251 A1 | 6/2009 | Manzer et al. | |
| 2009/0183430 A1 | 7/2009 | Schubert et al. | |
| 2009/0217575 A1 | 9/2009 | Raman et al. | |
| 2009/0253947 A1 | 10/2009 | Bandvold et al. | |
| 2009/0308787 A1 | 12/2009 | O'Connor et al. | |
| 2010/0040510 A1 | 2/2010 | Randhava et al. | |
| 2010/0162780 A1 | 7/2010 | Scharf | |
| 2010/0180805 A1 | 7/2010 | Cheiky | |
| 2010/0218417 A1 | 9/2010 | Bauldreay et al. | |
| 2010/0223839 A1 | 9/2010 | Perez et al. | |
| 2010/0257775 A1 | 10/2010 | Cheiky | |
| 2010/0270505 A1 | 10/2010 | Gallaspy et al. | |
| 2010/0300866 A1 | 12/2010 | Van Aardi et al. | |
| 2011/0023566 A1 | 2/2011 | Lodwig et al. | |
| 2011/0177466 A1 | 7/2011 | Cheiky | |
| 2011/0209386 A1 | 9/2011 | Cheiky | |
| 2011/0212004 A1 | 9/2011 | Cheiky | |

OTHER PUBLICATIONS

Laird, David, The Charcoal Vision: A win Win Win Scenario, 2008, Agron. J., vol. 100, No. 1, p. 178-181 (2008) http://biochar.bioenergylists.org/node/1305.*

J.A. Mathews; "Carbon-negative biofuels", in Energy Policy 36 (2008) pp. 940-945.

Z. Rosenberg; "More on Commerical Carbon Resistors as Low Pressure Guages," Intl. Jour of Impat. Eng. 34 (2007) pp. 732-742.

R. Buerschaper, "Thermal and Electrical Conductivity of Graphite and Carbon at Low Temperature," Journal of Applied Physics, (1944) pp. 452-454.

I.M. Lima, "Physiochemical and Adsorption Properties of Fast-Pyrolysis Bio-Chars and their Steam Activated Counterparts," J.Chem. Tech. Biotechnical (2010), 85: 1515-1521.

Z. Rosenberg; "More on Commercial Carbon Resistors as Low Pressure Guages," Intl. Jour. of Impat Eng. 34 (2007) pp. 732-742.

R. Buerschaper, "Thermal & Electrical Conductivity of Graphite & Carbon at Low Temperatures," Jour. of App. Physics; (1994) pp. 452-454.

I.M. Lima, "Physiochemical & Adsorption Properties of Fast-Pyrolysis Bio-Chars & their Steam Activated Counterparts," J. Chem. Biotechnical (2010) 85, pp. 1515-1521.

Cheng, CHih-Hsin; "Stability of Black Carbon in Soils Across a Climatic Gradient," Jour. of Geophysical Research Biogeosciences; 113 (2008) G02027; pp. 1-10.

Lehmann, J.; Nutrient Avail. & Leaching in an Archaeological Anthrosol & Ferraisol of the Central AMazon Basin: Fertilizer, Manure.; Plant Soil 249 (2003); pp. 343-357.

Preston, C.M.: Black (Pyrogenic) Carbon; a Synthesis of Current Knowledge & Uncertainities w/Special Consideration of Boreal Regions; Biogeosciences 3 (2006); pp. 397-420.

Tryon, E.H.; "Effect of Charcoal on Certain Physical, Chemical, & Biological Properties of Forest Soils," Ecological Monographs, vol. 18, No. 1 (Jan. 1948); pp. 81-115.

Faludi, J.; "World Changing Change Your Thinking a Carbon-Negative Fuel;" Oct. 16, 2007; www.worldchanging.com.

Laird, David; "The Charcoal Vision: A Win Win Scenario," 2008, Agron, J., vol. 100, No. 1, pp. 178-181.

Ogawa; "Carbon Sequestration by Carbonization of Biomass & Forestation; 3 Case Studies," Mitigation & Adaption Strategies for Global Change, vol. 11 (2006); pp. 429-444.

Demirbas, "Effects of Temperature & Particle Size on Bio-Char Yield from Pyrolysis of Agricultural Residues," J. Anal. Pyrolysis, vol. 72 (2004); pp. 243-248.

Kim et al.; Characteristics of Crosslinked Potato Starch & Starch-Filled Linear Low-Density Polyethylene Films, Carbohydrate Polymers, vol. 50 (200); pp. 331-337.

Norman, et al.; "Best Management Practices for Reclaiming Surface Mines in Washington and Oregon," Open-File Report 0-92-2, revised ed. Dec. 1997; www.oregongeology.org Feb. 9, 2010.

E. Gegver & K. Hayek; "A Fully Programmable System for the Study of Catalytic Gas Reactions," 1985 J. Physc. E: Sci. Instrum. 18 836.

D.C. Elliott; "Liquid Fuels by Low-Severity Hydrotreating of Biocrude," Dev. in Thermochemical Biomass Conversion; vol. 1, pp. 611-621.

Dinesh Mohan, "Pyrolysis of Wood/Biomass for Bio-Oil: A Critical Review," Energy & Fuels (2006) 20, pp. 848-889.

Ramesh K. Sharma; "Catalytic Upgrading of Pyrolysis Oil," Energy & Fuels (1993), 7, pp. 306-314.

Thiam Leng Chew, "Catalytic Processes Towards the Production of Biofuels in a Palm Oil and Oil Palm Biomass-based Biorefinery," Bioresource Tech. 99 (2008), pp. 7911-8922.

K. Omata; "Optimization of Cu Oxide Catalyst for Methanol Synthesis under High C02 Partial Pressure Using Combinatorial Tools," App. Catalyst A: General 262 (2004), 207-214.

Kaoru Takeishi; "Dimethy Ether & Catalyst Development for Production of Syngas," Biofuels (2010) 1(1), pp. 217,226.

* cited by examiner

METHOD FOR PRODUCING NEGATIVE CARBON FUEL

TECHNICAL FIELD

The present invention relates generally to biofuel and more particularly to methods for producing negative carbon biofuel by concurrent production of biofuel and sequesterable biochar in unmixed form from biomass.

DESCRIPTION OF THE RELATED ART

Negative carbon fuels are defined as fuels that are produced via a process that also sequesters some of the carbon contained in the carbon-containing feedstock used to produce the fuel. A similar and related concept is that of carbon negative fuels, which refer to fuels whose production removes more carbon dioxide from the atmosphere than carbon dioxide emitted from combustion and carbon dioxide added from processes used to make the fuels. Both are possible if some of the carbon from a carbon-containing input (e.g. biomass) is removed to the ground in more or less permanent form, while the remaining carbon from the input is converted to fuel. The production of negative carbon fuels or carbon negative fuels is desirable because the biosphere is presently overburdened by carbon emissions produced from fossil fuels. The burning of fuels presently contributes to an annual release of 4 billion metric tons of carbon dioxide into the atmosphere and the injection of 2 billion metric tons of carbon dioxide into the world's oceans. It has been well documented that these carbon emissions negatively impact living organisms in the oceans as well as on land.

There is presently intense interest in producing biofuels from a wide variety of feedstocks, in order to provide suitable replacements for fossil fuels. In particular, it is desirable to combine biofuel production with carbon sequestration, yielding a negative carbon or carbon negative product. The idea of carbon negative fuels has been previously discussed. See, for example, J. A. Mathews, "*Carbon-negative biofuels*", in *Energy Policy* 36 (2008) pp. 940-945. Typical production of biofuels, however, utilizes pyrolysis processes which produce a resinous mixture of oil and carbon along with significant amounts of CO2. The gas streams that are produced are contaminated with various agents, such as sulfur. The carbon is also contaminated with tar products. It is desirable to find a process which produces negative carbon or carbon negative fuel in which the fuel and the carbon are produced as separate and uncontaminated products.

Approaches directed toward the production of carbon negative fuels include those described in US Patent Publication 2010/0311157, which teaches the production of biofuels from algae as feedstock. The process is claimed to be carbon negative due to the high absorption of $CO_2$ by the algae. US Patent Publication 2010/0040510 discloses a multistage pressurized fluidized bed gasifier operating between 780° C. and 1100° C. that converts biomass to synthesis gas and biochar. The biochar is said to be capable of being added to soil. The formation of methane, gasoline-like volatiles such as BTX (benzene, toluene, and xylene) and tar is explicitly avoided. The gasifier is said to possibly produce carbon negative fuel. US Patent Publication 2008/0317657 discloses a system and method for sequestering carbon in the form of char created by gasifying biomass in an unspecified reactor vessel. A low heating value producer gas is a by-product of the process. US Patent Publication 2004/0111968 discusses pyrolyzing biomass to produce char and pyrolysis gases which are steam reformed to hydrogen. The char is treated to become a carbon based fertilizer.

BRIEF SUMMARY OF EMBODIMENTS OF THE INVENTION

In its most general form, the present invention discloses a method for making negative carbon fuel via the concurrent production of combustible fuels (and chemicals) and carbon in unmixed form from a carbon-containing input. In an embodiment of this invention, the carbon-containing input may include biomass. In another embodiment, the process may include a selective pyrolysis of biomass performed in a novel reactor using discrete increasing temperatures under pressure. This process is called biofractioning. The novel reactor has been described in detail in co-owned U.S. patent application Ser. No. 13/103,905, titled "Method for Biomass Fractioning by Enhancing Thermal Conductivity" and co-owned U.S. patent application Ser. No. 13/019,236, titled "System and Method for Biomass Fractioning," the contents of which are incorporated herein by reference in their entireties.

The carbon produced from this biofractioning process is sequestered. Using this process the resulting fuel is negative carbon. The fuel and the carbon arise separately and substantially uncontaminated, avoiding the resinous mixture of standard processes. In a still another embodiment, the biofractioning process produces carbon negative fuel.

One embodiment of the invention is directed toward a method for making negative carbon fuel, comprising: concurrently converting a carbon-containing input to: (a) combustible fuels, refinery feedstock or chemicals; and (b) sequesterable carbon; wherein the combustible fuels, refinery feedstock or chemicals arise in substantially separate and uncontaminated form from the sequesterable carbon. In some cases, the carbon-containing input may comprise biomass. The step of converting the carbon-containing input may comprise, e.g., subjecting biomass to ramps of temperatures under pressure, wherein the pressure increases the thermal conductivity of the partially carbonized biomass. In one implementation, subjecting biomass to ramps of temperatures under pressure is performed using mobile equipment. The method may further comprise choosing a biomass conversion route based on a composition of the biomass and/or dispensing the biomass as thin sheets.

In some embodiments, a ratio of sequesterable carbon to combustible fuel is controlled via selection of biomass feedstock or by selection of temperature ramp profile and pressure. By way of example, the sequesterable carbon may be sequestered by use as a soil amendment, by underground storage as coal, or by addition to soil containing compost material. The sequesterable carbon may be used for carbon offsets and/or carbon credits. According to one implementation, at least some of the sequesterable carbon is reacted with oxygen, carbon dioxide, methane or steam to generate synthesis gas. The synthesis gas may be converted to combustible fuels, refinery stock or chemicals. In some cases, at least one of the combustible fuels, refinery stock or chemicals is certified as carbon negative.

The above method may further comprise blending the combustible stocks, refinery stock, or chemicals with one or more of: gasoline, diesel, jet fuel, kerosene, light naphtha, heavy naphtha, light cycle oil, and heavy cycle oil. Additionally, the method may further comprise blending the combustible stocks, refinery stock, or chemicals with one or more of: methanol, ethanol, propanol, isopropyl alcohol, n-butanol, t-butanol, pentanol, hexanol, heptanol, octanol, butanediol, dimethyl ether, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE) and fatty acid methyl ester (FAME). In further embodiments, the method may also comprise blending the combustible stocks, refinery stock, or chemicals with one or more of: detergent, combustion improver, cetane improver, emulsifier, antioxidant, antifoam agent, corrosion inhibitor, wax crystal modifier, icing inhibitor, lubricity agent and distillate flow improver.

Another embodiment of the invention is directed toward an unleaded fuel blend produced according to the above method and suitable for combustion in an automobile including gasoline and diesel engines, gas turbines for power generation, or aviation engine, the fuel blend comprising: 0.5% or more of combustible fuel or refinery feedstock; and 99.5% or less of one or more of: gasoline, diesel, jet fuel, kerosene, light naphtha, heavy naphtha, light cycle oil, and heavy cycle oil.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the invention are directed toward methods for producing negative carbon biofuel by concurrent production of biofuel and sequesterable biochar in unmixed form from biomass.

Figure 1:
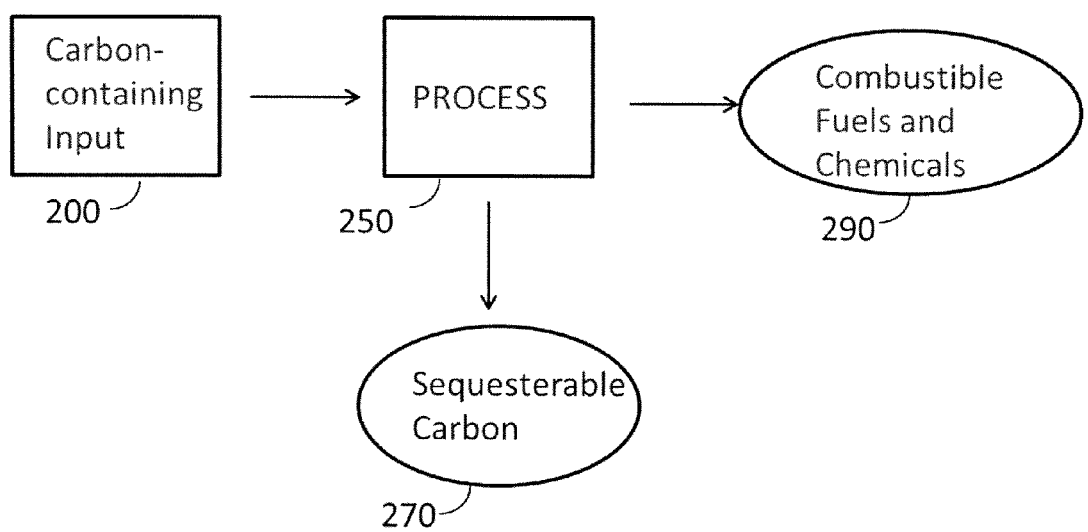
FIG. 1 is a flow diagram illustrating a method of making negative carbon fuel in accordance with an embodiment of the invention.

FIG. 1 is a flow diagram illustrating a method of making negative carbon fuel in accordance with an embodiment of the invention. Specifically, a carbon-containing input 200 is processed in process 250 to produce concurrently combustible fuels and chemicals 290 and sequesterable carbon 270 in a substantially uncontaminated and separate form. Combustible fuels and chemicals 290 can be negative carbon, while carbon-containing input 200 can include, but is not limited to, biomass, biomass-containing material, hydrocarbons, oxygenates such as alcohols, aldehydes, ketones and ethers. Process 250 refers to any sequence of steps that convert the carbon-containing input 200 into outputs 290 and 270 as separate entities in a substantially uncontaminated form. These processes can include, but are not limited to, a biofractionation process which thermo-chemically converts the input at increasing temperatures under pressure. Sequesterable carbon 270 refers to any carbon that is stored for long periods of time, including carbon that is stored underground or used as a soil amendment. Combustible fuels and chemicals 290 can include, but are not limited to, gasoline, gasoline-components, jet fuel, diesel, naphtha, oxygenate fuels such as methanol and dimethyl ether, hydrogen, methane, light gas oil, and vacuum gas oil. The process for determining whether output 290 is negative carbon is discussed hereinbelow with respect to FIG. 11.

Figure 2:
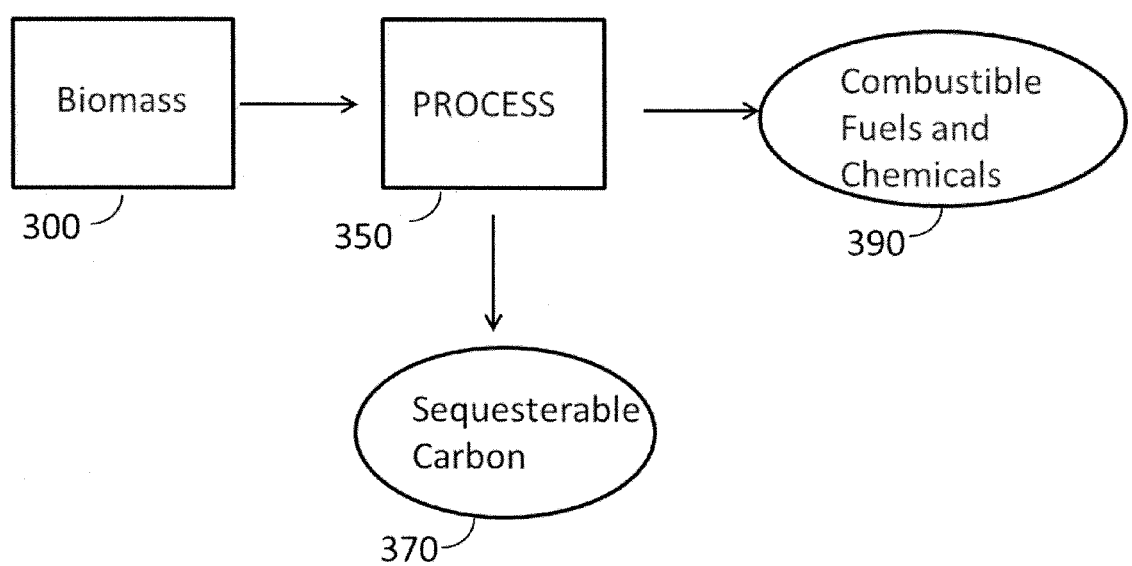
FIG. 2 is a flow diagram illustrating a method in which biomass is the carbon-containing input in accordance with an embodiment of the invention.

FIG. 2 is a flow diagram illustrating an embodiment of the invention in which the carbon-containing input comprises biomass. Biomass 300 is fed as input into process 350, which concurrently outputs combustible fuel and chemicals 390 and sequesterable carbon 370 as substantially uncontaminated and separate entities.

As used herein, the term 'biomass' includes any material derived or readily obtained from plant or animal sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, sunflower seeds, fruit seeds, and legume seeds. The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

Figure 3:
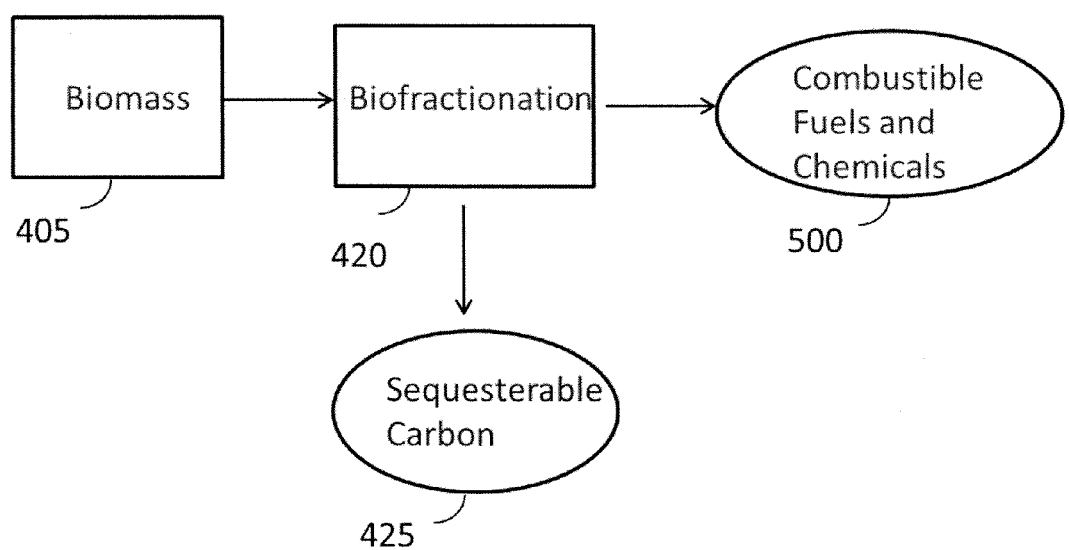
FIG. 3 is a flow diagram illustrating a method in which biomass is the carbon-containing input and biofractionation is the process which produces negative carbon fuel.

FIG. 3 is a flow diagram illustrating a method in which biomass is the carbon-containing input and biofractionation is the process which produces negative carbon fuel. This process subjects the biomass to decomposition using temperature ramps under pressure. It is described in detail in co-owned U.S. patent application Ser. Nos. 13/103,905 and 13/019,236.

Figure 4:
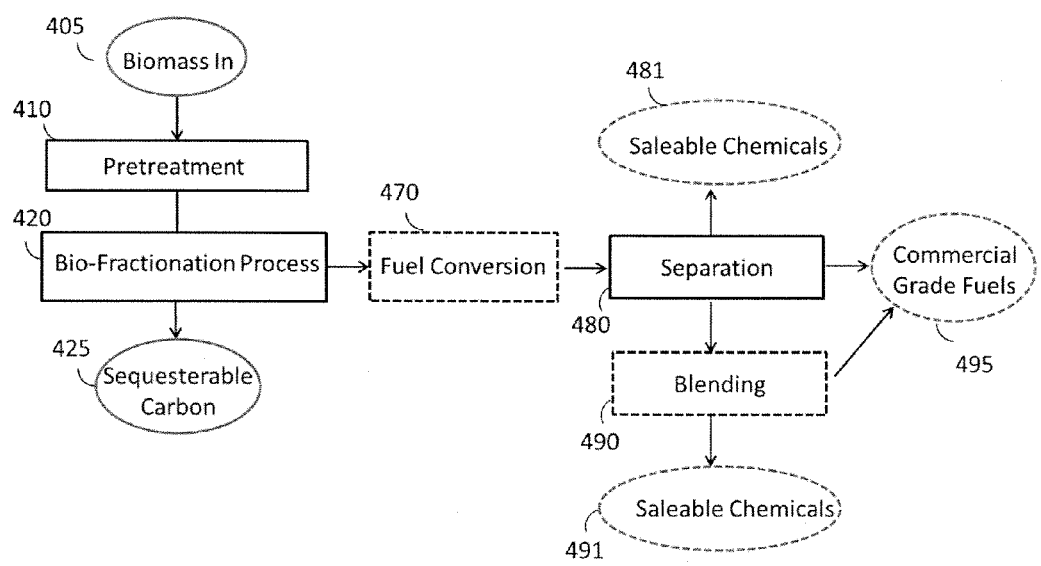
FIG. 4 is a flow diagram illustrating a method for biomass treated with a bio-fractionation process to produce negative carbon fuel in accordance with an embodiment of the invention.
Figure 5:
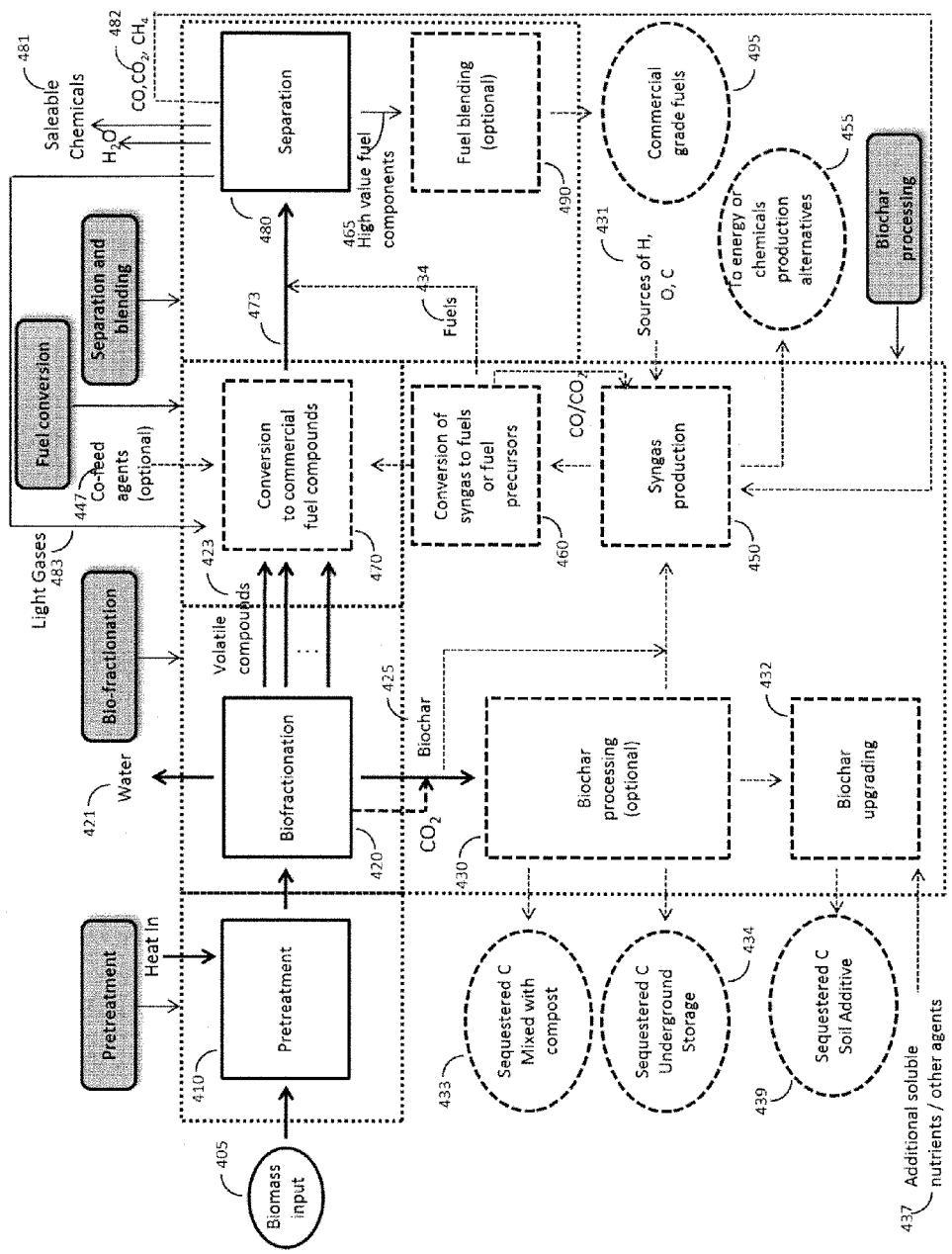
FIG. 5 is a flow diagram illustrating various paths for the production of negative carbon fuel.

Referring now to FIG. 3, biomass 405 is inputted into biofractionation process 420 to concurrently produce combustible fuels 500 and sequesterable carbon 425. FIGS. 4 and 5 show additional embodiments of the embodiment shown in FIG. 3, wherein biomass 405 is pretreated in operation 410 prior to being subjected to the biofractioning process 420. The conversion process produces sequesterable carbon 425 (sometimes referred to herein as BMF char) and volatile gas streams 423.

With continued reference to FIGS. 4 and 5, the volatile gas streams 423 are transformed to commercial grade fuels 495 via separation and blending processes 480 and 490, respectively, which can also produce saleable chemicals 481 and 491. An optional fuel conversion process 470 converts the volatile gas streams to renewable fuel components 473. BMF char 425 may partly be converted to synthesis gas via syngas production step 450. The synthesis gas can have numerous uses, including conversion to fuels and fuel precursors via process 460, and utilization in energy production or chemical production 455. Synthesis gas production process 450 can receive input from: (i) biochar processing 430, (ii) external sources of hydrogen, carbon or oxygen 431, (iii) recycled carbon monoxide or carbon dioxide from process 460, or (iv) recycled gases after the separation process 482.

In some embodiments, BMF char 425 may be sequestered in underground storage product 434. BMF char may also be mixed with compost to yield sequestered product 433. Direct utilization of the biochar as a soil amendment is also possible, since the residence time of biochar in soil is in the order of millennia. The latter has been determined from the persistence of biochar as a soil enhancement agent in Amazonian soil terra preta. BMF char 425 may also be upgraded via different techniques and sold as a soil fertilizer 439 to enhance soil growth. In further embodiments, BMF char 425 may optionally be processed prior to being sold directly for various end uses such as activated charcoal, gas purifier, coal purifier and water purifier. The commercial grade negative carbon fuels 495 arise from the concurrent production of biofractionation-derived renewable fuels and sequesterable biochar.

Figure 6:
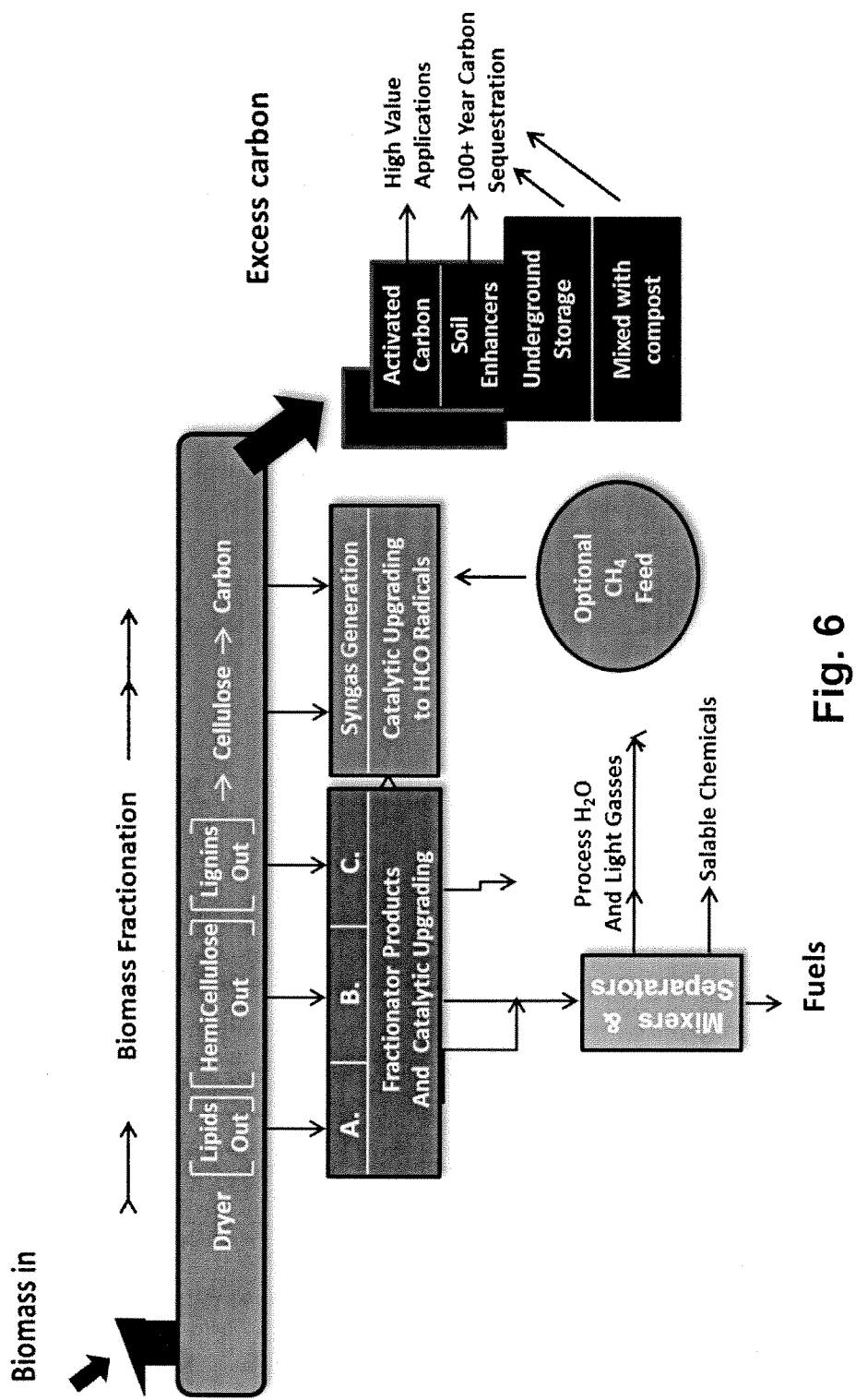
FIG. 6 is a block diagram illustrating an embodiment for producing negative carbon fuel.

FIG. 6 is a block diagram illustrating an embodiment for producing negative carbon fuel. In this embodiment, biomass as carbon-input is biofractionated into volatile components which arise from conversion of lipids, hemicellulose, and lignins within the biomass. The volatile components may be catalytically converted to fuels and saleable chemicals. The carbon (as biochar) that is produced may be used as activated carbon, or sequestered via use as a soil enhancer, underground storage, or mixture with compost. The basic steps involved in the biofractionation process will now be described in further detail.

Biomass Pretreatment

Referring again to FIG. 4, operation 410 involves the pretreatment of the biomass prior to being subjected to biofractioning process 420. The purpose of the pretreatment is to facilitate the subsequent bio-fractioning process 420, which involves a stepwise decomposition of biomass at increasing temperatures under pressure. This process is facilitated if the biomass is ground and dispensed onto a chamber as a thin sheet. The biomass may be ground by a variety of equipment including, but not limited to, equipment for making mulch, chips, pellets, or sawdust. Ground particle size may range from 0.001 inch to 1 inch in diameter, limited by processing equipment size and thermal transfer rates.

Embodiments of the invention feature dispensation onto a biomass chamber that is much wider and longer than it is thick. In some cases, biomass is dispensed into thin sheets whose total thickness is 1 to 30 times the biomass particle size. In some cases, a preferred thickness for the chamber for uncompressed biomass (which is ground or chopped to ⅛" or smaller) is approximately ¾" in thickness. As the biomass is heated and further pulverized (as discussed below), the emerging BMF char quickly condenses to a layer about ¹⁄₁₀" thick. This aspect ratio ensures mild pyrolyzing conditions that allow the collection of useful chemical compounds known as bio-intermediary compounds as well as the production of BMF char. A person of skill in the art will appreciate that these biomass chambers can be sized in width and length along with the diameter of their corresponding drive disc to any such size as appropriate for the desired throughput for the biomass fractionator, without departing from the scope if the invention.

Dispensation as thin sheets assures an environment similar to laboratory scale mild pyrolysis conditions. In practice the environment is scalable in that it can be expanded in two dimensions to any practical working throughput while retaining a constant thickness for heat treatment of incoming materials. The biomass may be dispensed in pre-dried form, or it may be dried after dispensation. Biomass may be loaded piecemeal onto a plurality of movable biomass reaction chambers which are movable using conventional drive mechanisms such as gear drives, chain drives, ratcheting sprockets, etc. In addition to linear displacements, the reaction chambers may also be arranged on a disc that rotates continuously or in a stepwise fashion.

Biomass Biofractioning

In some embodiments, the dispensed biomass is subjected to a novel biofractioning process 420 described in detail in co-owned U.S. patent application Ser. Nos. 13/103,905 and 13/019,236. This process subjects the biomass to decomposition that produces volatile gas streams 423 using discrete temperature increments under pressure. The pressure serves to increase the thermal conductivity of partially carbonized biomass and accelerates the decomposition.

Figure 7:
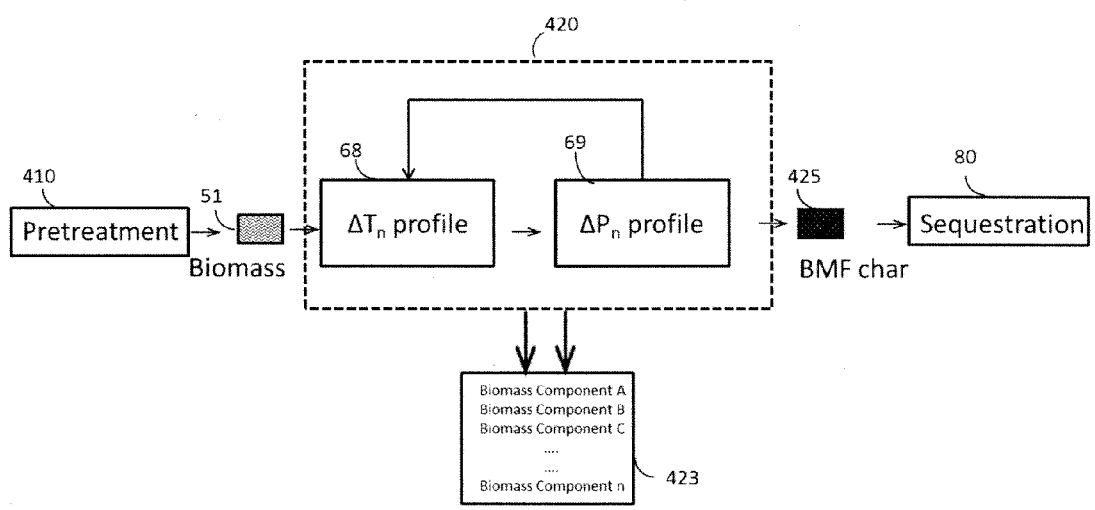
FIG. 7 is a flow diagram illustrating the basic operational principles behind the conversion of biomass into BMF char, in accordance with an embodiment of the invention.

FIG. 7 is a flow diagram illustrating the basic operational principles behind the conversion of biomass into BMF char, in accordance with an embodiment of the invention. In particular, FIG. 7 depicts the time sequence of the processes in the embodiments shown in FIGS. 4 and 5. Referring to FIGS. 5 and 7, biomass 51 is pretreated in process 410 and then subjected to a series of temperature ramp profiles ($\Delta Tn$) and pressure shock profiles ($\Delta Pn$), where n is an integer greater than or equal to 1 that describes the stages in the step-wise decomposition of the biomass 51. In particular, the biomass 51 is subjected first to a heating profile ΔT1, typically a linear temperature ramp, by a heating agent such as a metal anvil at processing station 68. Typically, the purpose of the first ΔT1 profile is to dewater the biomass, producing processing water 421. Subsequent ΔTn profiles end at progressively higher temperatures and serve the purpose of outgassing and thermo-chemically converting solid biomass to volatile bio-compounds. These useful bio-compounds emerge at progressively higher devolatilization temperatures. In order to accomplish this devolatilization in a selective manner, the temperature treatment is accompanied by a pressure treatment. In the embodiment of FIG. 7, this is achieved using compacting station 69 (e.g., a series of anvils) for subjecting the biomass to accompanying pressure profiles ΔPn comprising a sequence of pressure shocks that exploit the inherent compressional features of carbon.

In some embodiments, the temperature profiles are linear ramps ranging from 0.001° C./sec to 1000° C./sec, and preferably from 1° C./sec to 100° C./sec. Processing heating station 68 may be heated by electrical heating elements, direct flame combustion, or by directed jets of heated working gas or supercritical fluid. For a given n, the heating profile and the pressure compaction profile may be linked via a feedback loop, or may be applied by the same agent simultaneously. Compacting station 69 may be controlled by electrically driven devices, air compressed devices, or any other four of energy that serves to impact load the biomass. A given volatile component or set of volatile components 423 of the decomposed biomass are collected after each application of a temperature ramp and pressure profile. After these processing steps, BMF char 425 emerges ready for the sequestration process 80.

Figure 8:
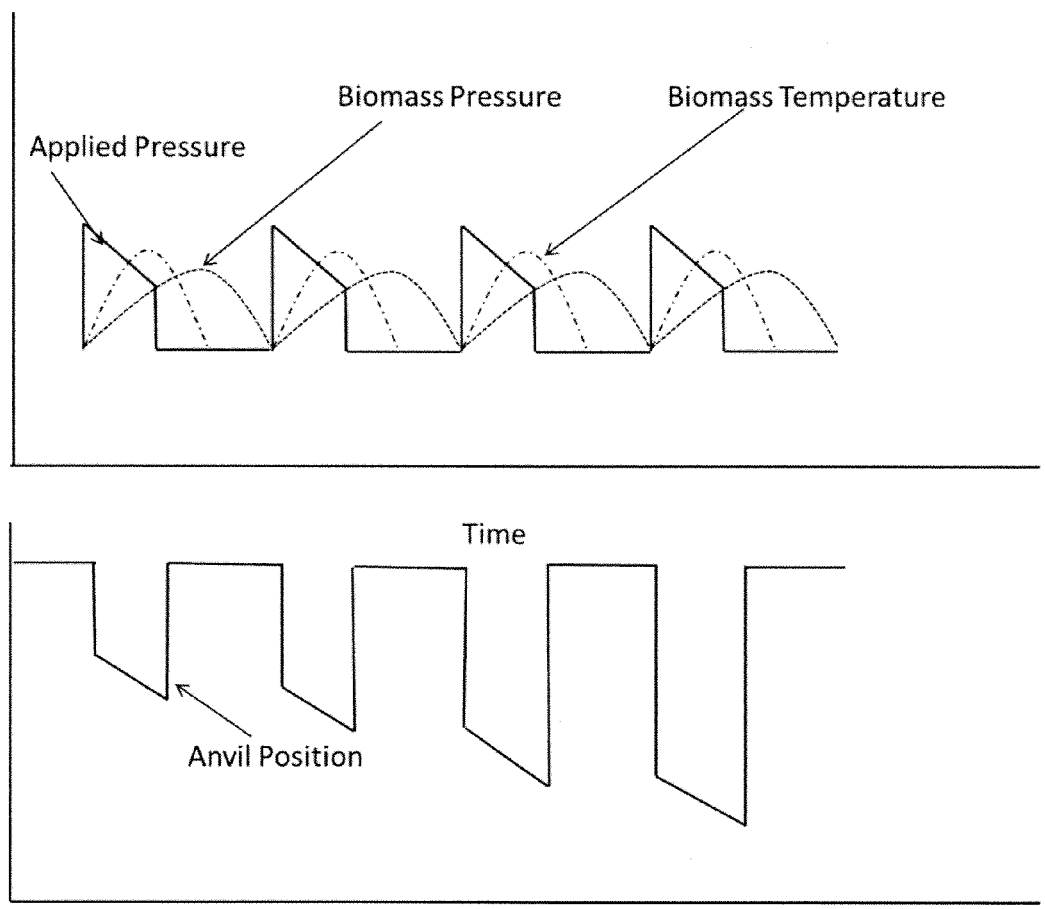
FIG. 8 is a diagram illustrating an example of applied pressure and corresponding biomass pressure and temperature within the reaction chamber, as well as anvil position during this time interval, in accordance with an embodiment of the invention.

The selective pyrolysis of the biomass arises out of the interplay between the applied pressure pulses, applied temperature and resultant pressures and temperatures experienced by the biomass. The process is illustrated diagrammatically in FIG. 8, which shows applied pressure, biomass temperature, biomass pressure and anvil position as a function of time. It is understood that a wide variety of different types of pressure pulses may be applied, and that the entire illustration is an expository device. In FIG. 8, pressure shocks applied via compacting station 69 (in FIG. 7) are shown as a series of triangular pressure pulses with an unspecified rest time. The process begins by utilizing the thermal conductivity of water. The biomass is first subjected to a temperature ramp sufficient to cause the biomass to release water. The released heated water vapor is then subjected to a pressure shock, which compresses the steam, thus accelerating the biomass decomposition. In some embodiments of the invention, the steam attains a supercritical state. In other embodiments, the steam does not attain a supercritical state.

With continued reference to FIG. 8, the pressure shock also aids in collapsing the biomass. A short time after peak pressure is applied, the anvil is pushed back by the pressure of extracted volatile compounds. When the volatile compounds are removed along with the steam, pressure within the biomass is decreased suddenly. Biomass temperature rapidly returns to base levels, and the anvil returns to its un-extended base position. After the water has been removed entirely from the biomass, the applied temperature causes hot localized areas within the biomass that initiate carbon formation. Compressive impacts on the newly formed carbon serve in turn to increase the thermal conductivity of the carbon. The increased thermal conductivity serves to efficiently transmit heat energy needed to break down the biomass to the next stage in its decomposition. Furthermore, because carbon exhibits compressional memory, compressive impacts are sufficient to exert this effect on thermal conductivity.

The compressional memory of carbon has been indirectly demonstrated in studies of commercial carbon resistors as low pressure gauges. See Rosenberg, Z. et al *International Journal of Impact Engineering* 34 (2007) 732-742. In these studies, metal discs were launched from a gas gun at high velocity such that they impacted an epoxy or Plexiglas target in which a carbon resistor was embedded. Resistance changes were measured as a function of time after impact. It was noted that the resistance decreased rather rapidly in less than a microsecond, and stayed low for several microseconds, in some cases over 10 microseconds, until it began to increase gradually to pre-impact levels. This evidences a memory effect or a slow relaxation after the impact. Because electrical resistance and thermal conductivity are inversely correlated for carbon as for metals (See, for example, Buerschaper, R. A. in *Journal of Applied Physics* 15 (1944) 452-454 and *Encyclopedia of Chemical Technology, 5th edition*), these studies reveal a compression memory on the part of the carbon. This compression memory is at least partly utilized in various embodiments of the invention.

Embodiments of the invention also utilize the increase in thermal conductivity as carbon is compressed. The change in electrical resistance with pressure in carbon microphones is a well-known effect used by carbon telephones and a carbon amplifiers. U.S. Pat. Nos. 203,016, 222.390 and 474,230 to Thomas Edison, describe apparatus that transform sound compressions (vibrations) to changes in electrical resistance of carbon granules. Carbon is even more sensitive than most metals in its inverse relationship between electrical resistance and thermal conductivity.

Below are data indicating the thermal conductivity of various substances (*CRC Handbook of Chemistry and Physics, 87th edition*) in comparison to the measured thermal conductivity of BMF char:

TABLE 1

| Select Thermal Conductivities in W/(m · K) | |
|---|---|
| Material | Thermal Conductivity |
| Copper | 390 |
| Stainless Steel | 20 |
| Water | 0.6 |
| Dry Wood | 0.3 |
| Fuels | 0.1 to 0.2 |
| Carrier Gases ($H_2$, $N_2$, etc.) | 0.01 to 0.02 |
| Carbon Char | 0.01 to 0.05 |
| BMF char | 1 to 5 |

As the thermal conductivity of the fanned carbon within the biomass increases due to pressure shocks, it becomes consequently easier to attain mild pyrolysis conditions within the biomass. As higher temperatures are reached, the fact that carbon is a better heat transfer agent than water enables higher boiling compounds to become volatile. Pressure shocks serve to compress these higher boiling compounds and contribute to fracturing cell walls within the biomass. The process is illustrated by FIG. 8, which shows anvil extension at peak pressure getting longer with subsequent pulse application, thus indicating successive biomass pulverization in conjunction with release of useful higher boiling compounds.

A variety of pressure profiles ΔPn are effective in increasing the carbon thermal conductivity. The magnitude of the pressure can vary from 0.2 MPa to 10 GPa and may be applied via a number of different technologies, including air driven pistons, hydraulically driven pistons, and explosive driven devices. The duration of the pressure application can vary from 1 microsecond to 1 week. It is understood that pressure pulses of different magnitudes and different time durations may be admixed to yield optimum results.

The efficient heat energy transfer executed by embodiments of the present invention can be enhanced by the addition of supercritical fluids in the reaction chamber. It is known that supercritical fluids can improve heat transfer as well as accelerate reaction rates. Certain embodiments can operate with supercritical carbon dioxide, supercritical water, supercritical methane, supercritical methanol, or mixtures of the above. It is possible that supercritical conditions are created internally with some pressure and temperature profiles.

A system capable of embodying the methods of the present invention is described in co-owned, co-pending U.S. Patent Application No. 2010/0180805 entitled "System and Method for Biomass Fractioning," the content of which is incorporated herein by reference in its entirety. This system comprises a biomass load and dump station, a heated pulverizing processing station for compressing the biomass, a biochar dumping station for removing residual biochar, and a plurality of biomass reaction compartments able to carry the biomass from station to station.

Fuel Conversion

Referring to FIG. 5, the volatile gas streams are optionally transformed to fuel compounds 473 via catalyst conversion process 470. These fuel compounds are typically termed renewable fuels and can be applied to any combustible fuel, such as gasoline, diesel, jet fuel and other fuel blend stocks such as BTX (benzene,toluene,xylene), derived from biomass and useful for transportation or other purposes. Various catalyst systems may be employed to effect this conversion depending on the nature of the volatile gas streams and desired fuel component. In some embodiments, a system is used wherein only a minimum number of bonds are broken and made, and consequently, the minimum amount of energy is spent breaking and making these bonds.

A system and method rendering the catalytic conversion process more efficient by using multiple programmable catalytic processing stations has been described in co-owned U.S. patent application Ser. No. 13/071,016 entitled "Method for Making Renewable Fuels" and co-owned U.S. patent application Ser. No. 13/071,038 entitled "System for Making Renewable Fuels." These patents describe a programmable system for routing biomass decomposition products through processing stations and a series of catalysts. There are three basic routing schemes in this programmable system, including: a) routing based on knowledge of the initial composition of the biomass, b) routing based on knowledge of the temperature of biomass component devolatilization, and c) routing based on knowledge of product yield.

Figure 9:
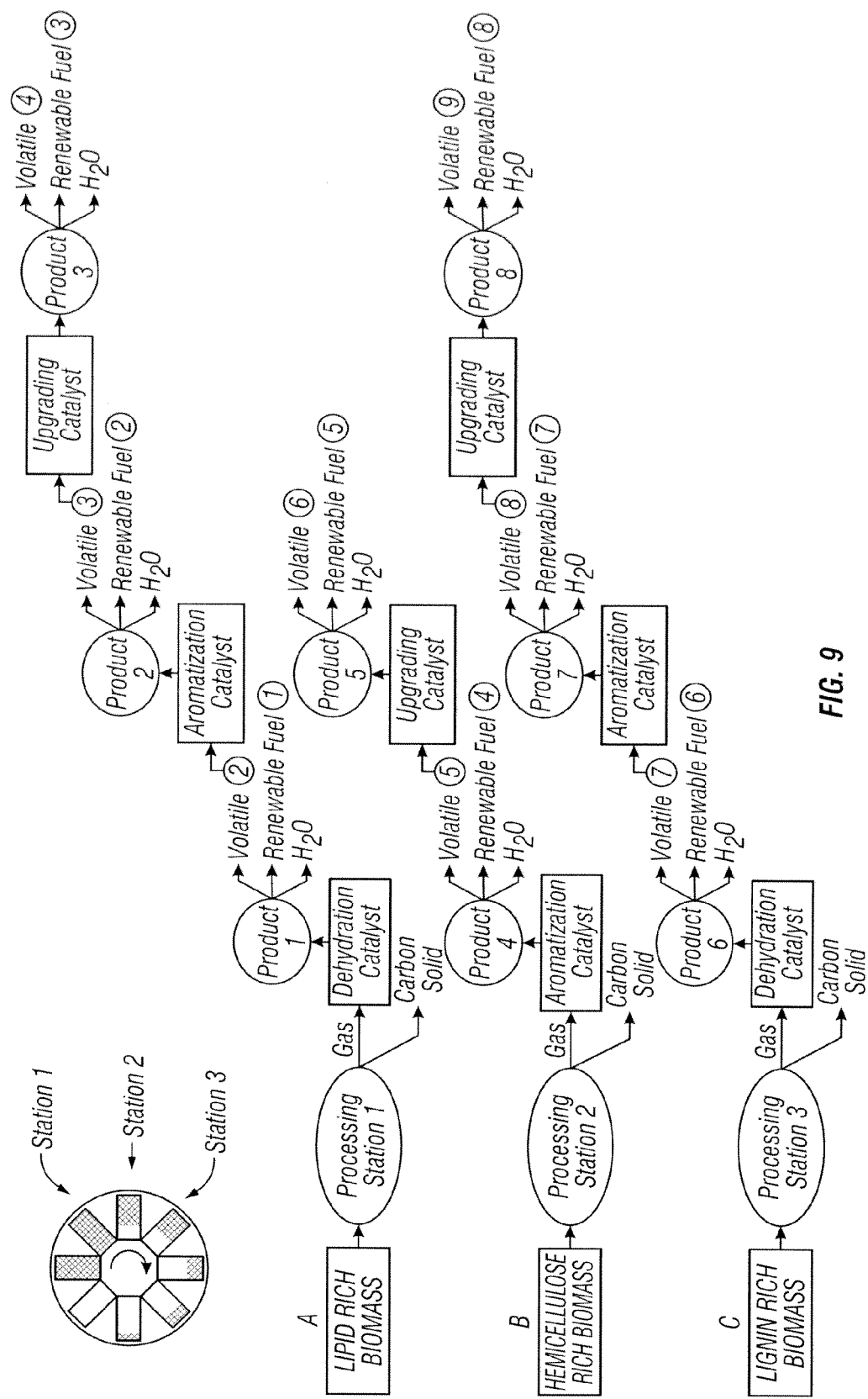
FIG. 9 is a diagram illustrating the conversion of fuels from various feedstocks in accordance with an embodiment of the invention.

FIG. 9 shows an embodiment of high-yield fuel conversion using knowledge of the initial composition of the biomass. Three different types of biomass feedstocks are shown as inputs to three processing stations, each being subjected to a particular array of catalytic columns for optimal product yield. In general, the biomass feedstocks in various stations can come from a single biomass input such that the feedstocks are subsequently processed using the three stations. Other embodiments feature multiple independent biomass inputs. While the number of processing stations can vary, the same catalytic columns are used to convert the volatile gases to renewable fuels. The order in which the catalytic columns are selected can vary. In the illustrated embodiment, a hemicellulose-rich biomass is converted to a carbonaceous solid and a volatile gas stream that is subjected to an aromatization catalyst and gas-upgrading catalyst, while a lipid-rich biomass and a lignin-rich biomass are similarly converted to carbonaceous solids and volatile gas streams, the latter are subjected first to an additional dehydration catalyst, but at different temperatures. The aromatization catalyst can be comprised of MFI type zeolites and metal modified MFI type zeolites, where the metal is selected from the group consisting of: Group VIB metals, Group VIIB metals, Group VIII metals, Group IB metals, Group IIB metals, Ga, In, and all combinations thereof. The gas-upgrading catalyst can be comprised of metal modified MFI type zeolites, where the metal is selected from the group consisting of: Ga, Zn, In, Mo, W, Cr, Pt, Pd, Rh, Ru, Au, Ir, and combinations thereof. The dehydration catalyst can be any acid catalyst, such as heterogeneous solid acid catalysts.

Volatile components can be recirculated to at least one of the following: a) one or more processing stations b) the dehydration catalyst, c) the aromatization catalyst or d) the gas-upgrading catalyst in order to create fuels.

Separation and Blending

As depicted in FIG. 4, volatile gas streams are passed through a separation process 480 after emerging directly from the biofractionation process 420 or catalytic conversion process 470. The separation process 480 may include condensation of the gas streams and removal of water, carbon monoxide, carbon dioxide, methane and light gases 483 typically comprising C2-C5 compounds. Additional steps may be added which separate different streams based on chemical or physical characteristics of the exiting streams. Saleable chemicals and light gases 481 may result from this process. The separation process may also be applied to liquid fuels obtained after condensation. Separation in this case is based on liquid physical characteristics, such as density, vapor pressure, or viscosity. The resulting renewable fuels 465 can be optionally blended in process 490 with renewable fuels from other processes such as fermentation, or with other fuels derived from fossil fuels, to produce suitable commercial fuels 495 for different markets.

The co-blending fuels can include, but are not limited to, gasoline, diesel, jet fuel, methanol, ethanol, propanol, butanol, butanediol, isobutanol, and vegetable oil. A co-blending fuel can also include any products from a fluidized catalytic cracking process, such as light naphtha, heavy naphtha, light cycle oil, heavy cycle oil, and kerosene. In some embodiments, additives may be added to the fuel or fuel blends. Such additives may include without limitation: detergents, combustion improvers, cetane improvers, emulsifiers, antioxidants, antifoam agents, corrosion inhibitors, wax crystal modifiers, distillate flow improvers, lubricity agents, icing inhibitors and antistatic agents.

Biochar Processing and Sequestration

After formation, BMF char 425 can be sold for numerous uses involving low surface and high surface area carbon, such as activated charcoal, gas purifier, coal purifier, water filter and water purifier. The BMF char 425 may be optionally treated in process 430 prior to being sold. The latter process may entail increasing the biochar surface area via a number of different reactions including those described herein. The BMF char may also be sequestered as discussed in the following two sections.

Carbon Sequestration Approaches

With further reference to FIG. 5, the BMF char 425 obtained from the biomass biofractionation step 420 can be sequestered in three ways, including (i) storage in underground storage formations as sequestered compound 434, (ii) sequestered by simple mixing with compost to yield product 433, or (iii) used as a soil additive 439. In all cases, the residence time for the sequestration is expected to be at least thousands of years. In one embodiment for underground storage, described in co-owned US Patent Application 2010/0257775, titled "System and Method for Atmospheric Carbon Sequestration," carbon is densified into anthracite-style carbon aggregations (coal) and stored in geologically stable underground deposits. The content of this application is incorporated herein by reference in its entirety. In another embodiment, carbon dioxide can be sequestered by injection in supercritical form into oil wells. One embodiment for carbon sequestration using a soil addition entails simple dispersal of BMF char onto soil. Sequestered product 433 can produce considerable amounts of methane and carbon dioxide due to the decomposition of the compost material. Sequestered products 434, 439 do not produce methane or carbon dioxide, whereas sequestered product 439 can be used to enhance soil growth.

Carbon Sequestration as Soil Amendment

Figure 10A:
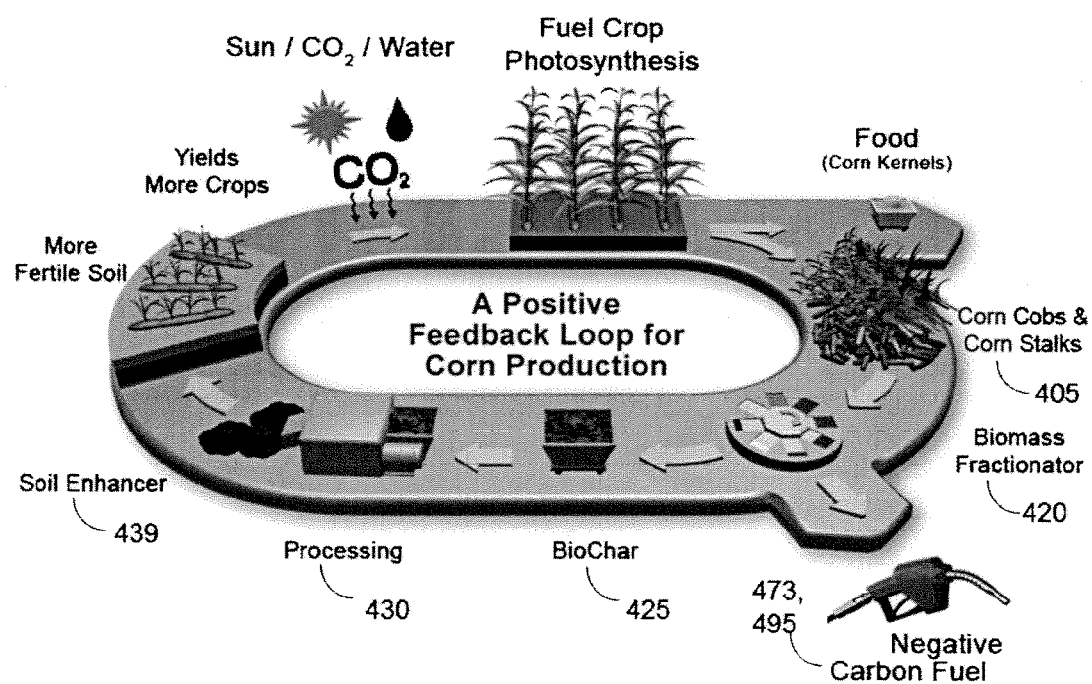
FIG. 10a is a diagram illustrating a carbon closed loop approach of the present invention in which biochar is sequestered as soil enhancer.

In some embodiments, the sequestered carbon produced from fuel production can be employed to increase soil productivity in order to counteract the ultimate burning of the fuel. FIG. 10*a* is a diagram illustrating a carbon closed loop approach of the present invention in which biochar is sequestered as soil enhancer. Specifically, FIG. 10*a* depicts the production of negative carbon fuel and subsequent biochar for soil enhancement using corn cobs and corn stalks as the biomass source. The closed loop nature for carbon dioxide utilization is demonstrated in this figure in accordance with an embodiment of the invention. Another embodiment relies on removing detrimental features inherent in biochars after formation, and in rendering the biochar pores hydrophilic in order to transform the biochar into a hospitable environment for microorganisms. The steps of this process are shown in FIG. 10*b* and will now be described.

Removal of Hydrocarbons

Typical charcoal contains a variety of hydrocarbons in various stages of decomposition, depending on the last temperature to which the charcoal was subjected. During early stages of heating, wood releases water vapor as it absorbs heat. Wood decomposition starts above 110° C., yielding primarily CO, CO2, acetic acid, methanol and traces of other components. Exothermic decomposition starts at around 280° C. and tar starts to form. Just above 400° C., the wood has been essentially converted into charcoal, but this charcoal still contains about ⅓ of its weight in tar material. Further heating is needed to drive off the tar. Because of the highly porous nature of wood, it is difficult to remove tar unless sufficiently high temperatures are reached beyond the equilibrium decomposition temperature of tar components. If present, small amounts of hydrophobic hydrocarbons, such as polyaromatic hydrocarbons (PAHs), within the char can inhibit colonization of the BMF char by microorganisms.

Figure 10B:
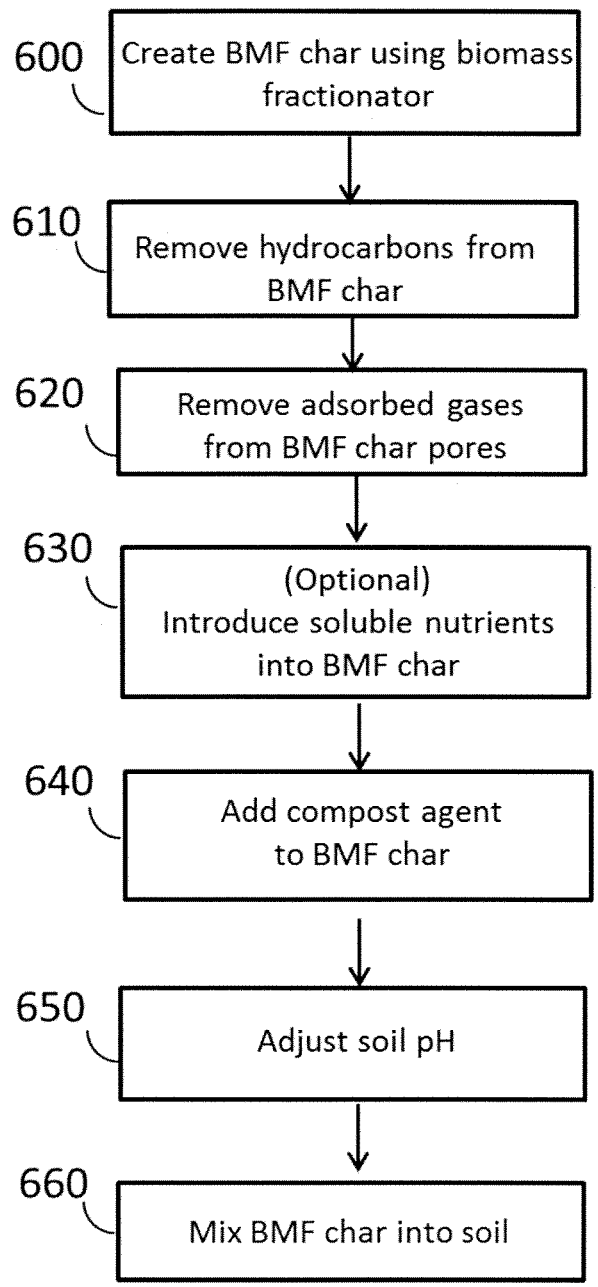
FIG. 10b is a flow diagram illustrating a process for rendering biochar suitable as a soil amendment.

FIG. 10*b* is a flow diagram illustrating a process for rendering biochar suitable as a soil enhancer. In particular, step 600 entails creating BMF char using a biomass fractionator. In order to render the BMF char hospitable for subsequent microorganism invasion, step 610 involves removing the hydrophobic hydrocarbons. In many cases, temperatures above 700° C. are required to remove the hydrophobic hydrocarbons from the BMF char walls. The hydrocarbon removal step may be combined with an activation step, which increases the char surface area. The activation step may includes reactions of the biochar with steam, water or oxygen.

Removal of Adsorbed Gases from Char Pores

The next step in the rendering the BMF char more hydrophilic involves process 620, which removes adsorbed gases within the BMF char pores to allow water infiltration. In some cases, the BMF char can be a high surface area compound (typically in excess of 300 $m^2/g$ in activated faun) that contains significant amounts of adsorbed gas within its pores. Because the adsorbed gas has high adhesion to the pore surfaces, it is preferably removed. A simple method for removal of adsorbed air is to immerse the BMF char in boiling water. For short periods of time (e.g., several hours), it has been found that water uptake is substantially insensitive to surface area, averaging around 50% uptake for samples varying from 20 $m^2/g$ to 500 $m^2/g$.

During or after the wetting step, optional soluble nutrients 437 may be introduced as part of process 630. The nutrients enter a high surface area environment and can exchange adsorbed gases to some degree. Nutrients can include macronutrients containing nitrogen, phosphorus, potassium, calcium, magnesium, and sulfur as wells as micronutrients containing molybdenum, zinc, boron, cobalt, copper, iron, manganese and chloride. The high surface area BMF char affords plants more effective access to these nutrients. Additionally, the BMF char retains these nutrients at times when rainfall tends to wash them off from the soil in the absence of BMF char. Besides water infiltration, other methods include ultrasonic, vacuum and impact removal of air.

Addition of Beneficial Microorganisms

With continued reference to FIG. 10*b*, step 640 involves adding a compost agent. Once wetted, the BMF char is ready to accept beneficial microorganisms. These microorganisms may comprise fungi, archaea and bacteria that supply nutrients to plants symbiotically. The microorganisms may be introduced in a number of different ways, including mixing the BMF char with compost and water, adding compost tea to the BMF char, blending the latter with compost, or blending the BMF char with potting soil. Process 640 may encompass any or all of these steps. Some embodiments feature the use of a compost tea including commercial sources of compost tea such as Bu's Brew Biodynamic Tea® (Malibu Compost Inc, Santa Monica, Calif.), Nature's Solution Compost Tea® (Nature's Technologies International LLC, Novato, Calif.) or MycoGrow® (Fungi Perfecti, Inc., Olympia, Wash.). The compost tea may be agitated to maintain an optimum oxygen concentration for microorganisms to thrive. Electric bubbling aerators, porous stones, or manual stirring are suitable methods to maintain sufficient aeration. Different compositions of fungi, archaea and bacteria may be used, depending on target soil.

Some embodiments may entail the use of beneficial fungi including members of the arbuscular mycorrhizal fungi, which express the glycoprotein glomalin on their hyphae and spores. These fungi are members of the phyla Glomeromycota, which helps bind soil particles together and is responsible for good soil tilth. When introduced into BMF char, the fungi express glomalin within the char pores and aid in maintaining good soil structure by binding the biochar to soil particles. Additionally, the root structure provided by the hyphae allows nutrients to penetrate in and out of the high surface area environment provided by the biochar.

Adjustment of Soil pH

It has been long been recognized that soil pH is an important variable in maintaining soil health and productivity. Soil pH tends to modify the bioavailability of plant nutrients. Some soils are inherently acidic or basic in nature and a soil amendment should consider its effect on soil acidity. Biochar can differ in its effect on soil pH depending on the biomass source of the biochar. Upon decomposition, corn cobs leave, for example, significant amounts of $K_2O$ in the biochar residue, and this compound tends to render the biochar basic. Addition of this basic biochar to a soil that is already basic may be detrimental to the soil. pH management has been practiced inadvertently by Amazon Indians in creating terra preta soils. Other materials are always present with charcoal in terra preta soils, such as bones, fired clay bits and wood ash. These materials buffer the acidic Latrelite soils. The bones and wood ash balance the pH of the acidic clay soils.

With further reference to FIG. 10b, step 650 involves adjusting soil pH. In some embodiments, soil pH can be shifted by adding pH adjusting compounds directly to the soil after BMF char addition. In other embodiments, additives can be added to the BMF char that can shift the BMF char pH. In further embodiments, BMF char can be added directly to the soil and left to self-neutralize for extended periods of time.

The first approach utilizes well known pH adjustment reactants applied to soil. Neutralization compounds useful for acidic biochar can include anions selected from the group of bicarbonates, carbonates, hydroxides, amines, nitrates, halides, sulfonates, phosphates, and carboxylates. These groups may comprise one or more functional groups within a polymer. This approach may also include oxides such as calcium oxide and magnesium oxide, which upon exposure to air produce basic compounds. Neutralization compounds useful for basic biochar can include inorganic acids such as HCl, $H_3PO_4$, and $H_2SO_4$, and organic acids such as humic, vanillic and ferulic acids. A dispersant may be optionally used.

In the second approach, any of the compounds listed in the first approach may be applied directly to the BMF char. Additionally, BMF char may be made less alkaline by impregnating it with bacterial compost tea (vide infra) containing acidic ingredients such as molasses, plant juice, or algal extractives. The biochar may be made acidic by addition of inorganic acids such as HCl and $H_2SO_4$, and organic acids such as humic, vanillic and ferulic acids. The biochar may be made more alkaline by addition of alkaline agents such as lime, bones, potassium carbonate or potassium hydroxide. Buffering agents may also be added. The third approach requires long-term exposure to the atmosphere to neutralize the pH via carbonic acid formation.

Mixing Soil and Biochar

Step 660 in the method of FIG. 10b comprises mixing BMF char into soil. In particular, a wide variety of different techniques exist for applying the BMF char to soil. The incorporation of BMF char into soil may be accomplished via BMF char integration into traditional farm machinery, such as the use of manure or lime spreaders in conjunction with plowing methods utilizing rotary hoes, disc harrows, chisels, etc. Banding methods which allow BMF char use without significantly disturbing the underlying soil may also be used. The BMF char may be added in solid form along with manure, compost, lime or mixed with water or liquid manure and applied as a slurry. It may also be mixed with topsoil or applied directly to an area where tree roots will extend.

Sequestration and Carbon Credits and Offsets

The simultaneous production of sequesterable carbon and renewable fuels allows for negative carbon fuel production and for obtaining carbon credits and carbon offsets. Present venues for certifying carbon credits under regulatory regimes include, but are not limited to, the European Union Emissions Trading Scheme, the United Nations Framework Convention on Climate Change, and the Regional Greenhouse Gas Initiative of the North East United States. Organizations that certify voluntary emissions reductions include, but are not limited to, the International Standards Organization (under standard 14064), the World Resources Institute (under GHG Corporate Accounting and Reporting Standard), the International Emissions Trading Association and the Climate Group (under Voluntary Carbon Standard), the World Wildlife Fund (under Gold Standard) and the Carbon Disclosure Project, the State of California (under the California Climate Action Registry), and the Western Climate Initiative (under the WCI Cap-and-Trade Program).

Figure 11:
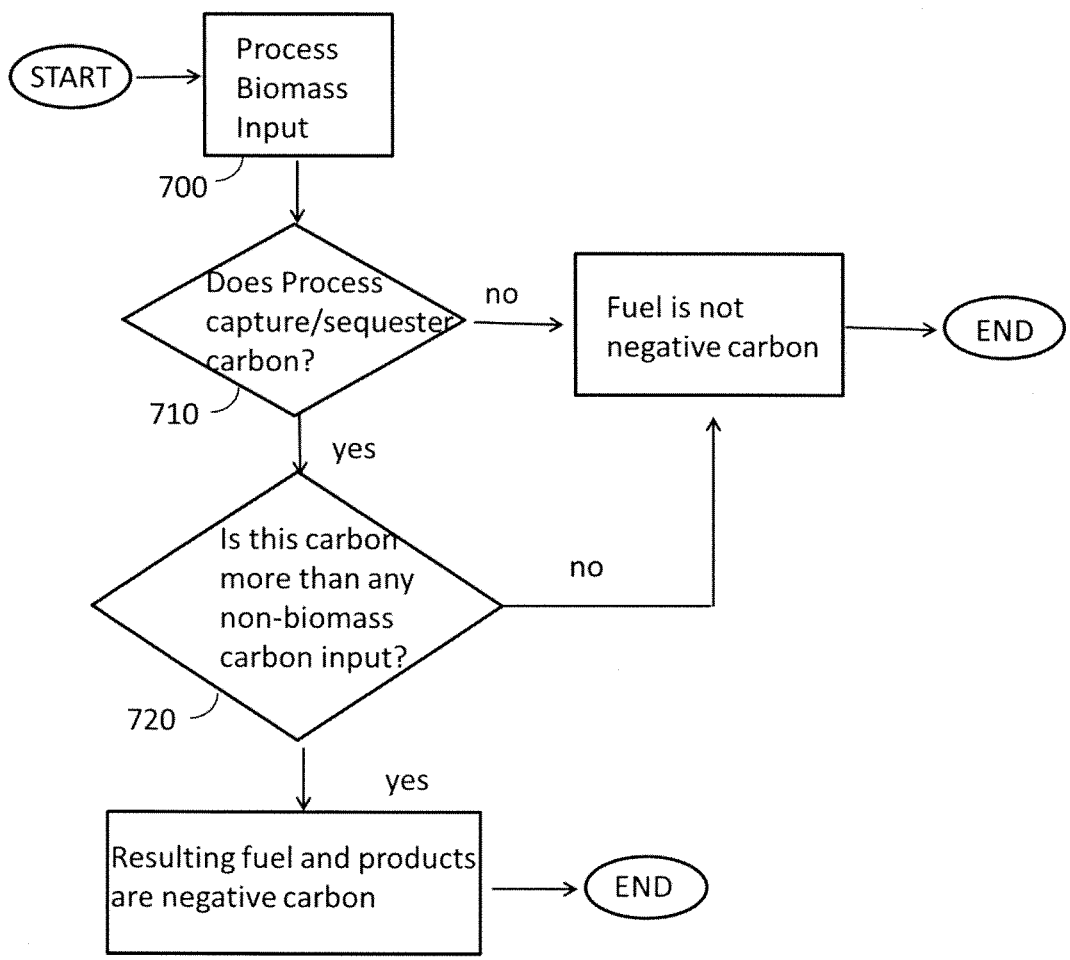
FIG. 11 is a flow diagram illustrating a process for determining whether a process produces negative carbon fuel, in accordance with an embodiment of the invention.

FIG. 11 is a flow diagram illustrating a process for determining whether a process produces negative carbon fuel. The figure depicts a procedure for an embodiment in which the carbon-containing input is comprised of biomass. Specifically, biomass is processed in process 700, which converts the input into combustible fuel and biochar as separate and uncontaminated products. Process 710 decides whether the process 700 captures or sequesters carbon. If no carbon is captured or sequestered, the fuel is not negative carbon. If some carbon is captured or sequestered, process 720 decides whether the carbon captured or sequestered is more than carbon obtained from any non-biomass carbon input. If the carbon captured or sequestered is more than the carbon input from a non-biomass source, then the produced fuels and products from this process are negative carbon. If not, the fuel or products are not negative carbon.

The procedure in FIG. 11 does not include carbon contributions to the biomass feedstock aside from the carbon contained within the feedstock. However, other carbon contributions from non-biomass inputs to the process are counted. Such non-biomass inputs may include co-feed materials and carbon contributions from energy inputs which rely on fossil fuels. Once carbon negativity is established, the extent of carbon negativity can be set by process parameters (e.g., temperature profiles & pressure shock profiles) which yield a greater amount of biochar relative to combustible fuel. A variable N can be defined as:

$$N=(\text{amount of carbon in biochar})/(\text{amount of carbon in combustible fuel})*100$$

The above equation quantifies the extent of carbon negativity. If the process produces an equal amount of biochar carbon to combustible fuel carbon, N=100 and the fuel can be labeled as N100. This ratio can also be controlled by proper selection of the biomass feedstock.

Figure 12:
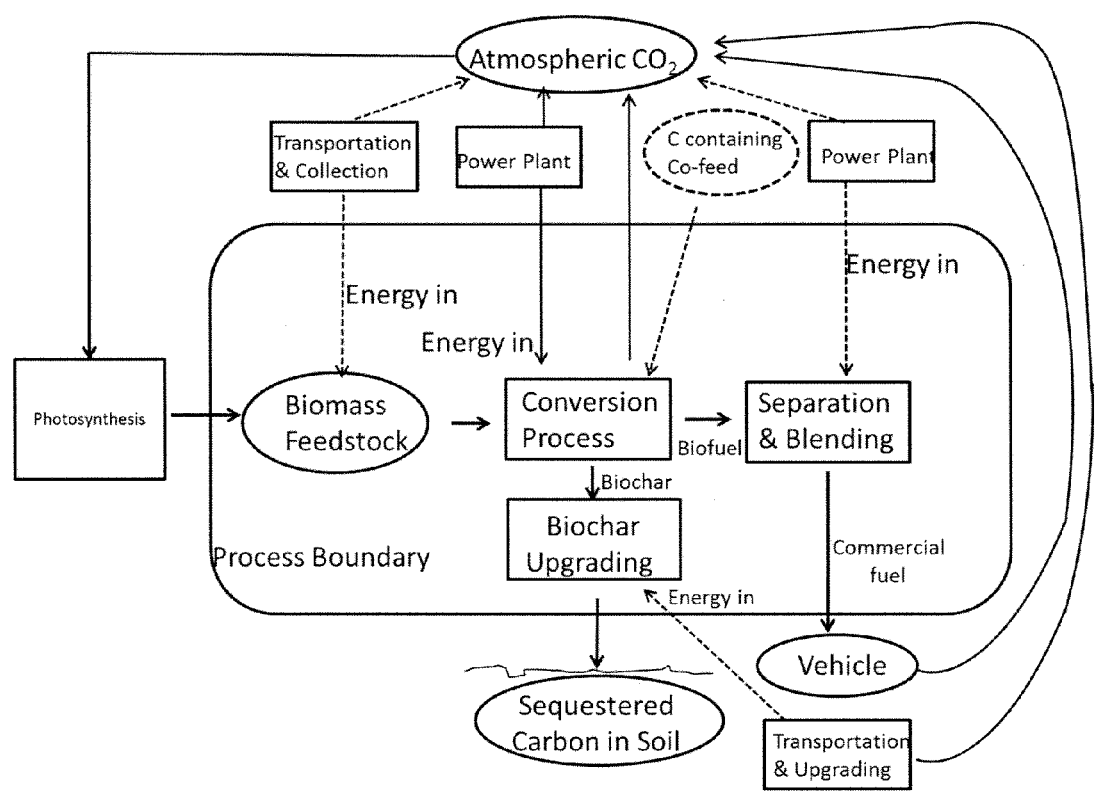
FIG. 12 is a flow diagram illustrating possible carbon pathways in accordance with an embodiment of the invention.

FIG. 12 is a flow diagram illustrating possible carbon pathways from the point of view of carbon dioxide balance. Atmospheric carbon dioxide is the source of carbon for the photosynthetic process that outputs biomass. Energy is needed to collect and transport biomass, and the production of this energy leaves a carbon footprint. This carbon footprint is not included in the procedure of FIG. 11. Other carbon footprints are left during the production of energy to effect the conversion of biomass into fuel and sequesterable carbon, energy for the separation and blending processes, and energy for biochar upgrading. The conversion process itself may release carbon dioxide. External to the process, vehicles burning commercial fuel release carbon dioxide back to the atmosphere. Sequestered carbon in soil may serve as a small source of carbon dioxide emission, depending on whether the carbon is mixed with compost. In the production of combustible fuel and sequesterable carbon as separate and uncontaminated products, some carbon dioxide is removed from the atmosphere by sequestering carbon in soil.

Biochar Conversion to Synthesis Gas

Figure 13:
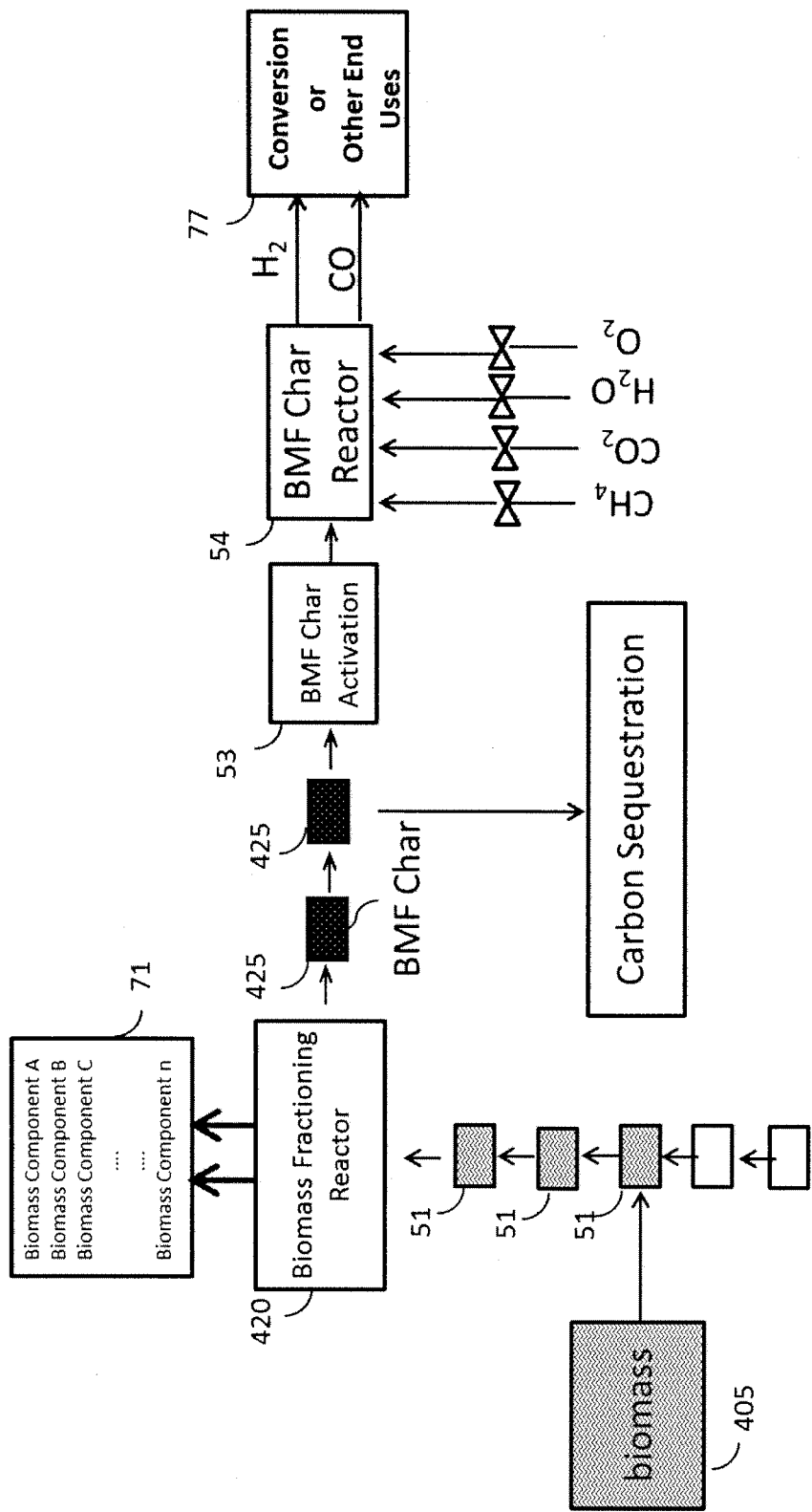
FIG. 13 is a flow diagram illustrating an embodiment of the present invention in which some carbon is sequestered and some carbon is converted to syngas prior to conversion to fuel.

Higher fuel yield (at a cost of carbon negativity) can be achieved by reacting some of the biochar to produce synthesis gas and converting the synthesis gas to fuel. The method for this biochar conversion has been disclosed in co-owned U.S. patent application Ser. No. 13/103,922 entitled "Process for Biomass Conversion to Synthesis Gas," the content of which is incorporated herein by references in its entirety. The basic flow diagram for this conversion is shown in FIG. 13. After emerging from the biomass fractionator 420, the BMF char 425 is activated prior to use in step 53. Activation is a well-known procedure for treating chars that increases char surface area and adsorptive capabilities.

BMF Char Reactions

BMF char can be reacted in char reactor 54 with one of $CH_4$, $H_2O$, $CO_2$ and $O_2$ as illustrated by the reactions:

$$C+CH_4 \rightarrow 2H_2+2C \quad \Delta H°=75 \text{ kJ/mol} \quad [1]$$

$$C+H_2O \rightarrow CO+H_2 \quad \Delta H°=132 \text{ kJ/mol} \quad [2]$$

$$C+CO_2 \rightarrow 2CO \quad \Delta H°=172 \text{ kJ/mol} \quad [3]$$

$$C+\tfrac{1}{2}O_2 \rightarrow CO \quad \Delta H°=-110 \text{ kJ/mol} \quad [4]$$

Equation 1 may be more appropriately written as:

$$C_{BMF}+CH_4 \rightarrow 2H_2+C_{BMF}+C_{methane} \quad [1a]$$

Thus the carbon in equations 2, 3, and 4 may represent either BMF carbon or carbon from methane, or both.

Any one of the above gaseous reactants with the BMF char may be introduced in supercritical form for faster kinetics. The oxygen concentration should be controlled to avoid complete oxidation of the char as:

$$C+O_2 \rightarrow CO_2 \quad \Delta H°=-393 \text{ kJ/mol} \quad [5]$$

The first three reactions are endothermic, while the fourth is exothermic. The energy for the first three reactions can come from channeling internal heat generated from the fourth reaction or from external sources, e.g., combustion of coal or natural gas, or electricity during off-peak hours. In principle, the heat generated from creating 2 moles of CO via the fourth reaction can be used to power the first three reactions. The following reactions are also relevant for this discussion:

$$H_2O+CO \rightarrow H_2+CO_2 \quad \Delta H°=-41 \text{ kJ/mol} \quad [6]$$

$$CH_4+3/2O_2 \rightarrow CO2+2H_2O \quad \Delta H°=-802 \text{ kJ/mol} \quad [7]$$

$$CH_4+\tfrac{1}{2}O_2 \rightarrow CO+2H_2 \quad \Delta H°=-35 \text{ kJ/mol} \quad [8]$$

$$CH_4+H_2O \rightarrow CO+3H_2 \quad \Delta H°=207 \text{ kJ/mol} \quad [9]$$

Equation 1 in particular deserves notice for allowing vast stores of methane to be converted to hydrogen. Present methane reformation on coal produces synthesis gas contaminated with sulfur, since the coal typically contains a few percent by weight of sulfur. The sulfur in the synthesis gas causes catalyst poisoning, and it is removed from the synthesis gas before introducing the latter into a catalyst bed. This represents extra cost and complexity, particularly for small scale modular plants. According to embodiments of the invention, the BMF char is actually cleaner than the incoming methane, leading to high purity synthesis gas.

Equation 1a evinces that carbon atoms from methane decomposition add a fresh layer to the BMF char surface. Any impurities in the methane feedstock, such as sulfur-based impurities, will tend to be buried in underlying high surface area char surface and eventually accumulate in the ash. The methane may be derived from a number of sources, including stranded gas and wet gas. This process is thus inherently resistant to impurities, but still able to produce high purity synthesis gas. The ability to add oxygen or water ensures that the BMF char surface remains active, as long as the CO removal rate is greater than the carbon deposition rate from the methane reaction. The BMF char can thus be considered to act as a sacrificial catalyst in that it is not consumed in the overall reaction, but does react sacrificially during intermediate stages.

The oxygen in the above reactions may economically be obtained from an air stream. It may also be obtained from a gas that comprises oxygen with a different concentration, such as gas containing pure oxygen, or gas obtained from the decomposition of an oxygen carrying species such as $N_2O$, $H_2O$, $H_2O_2$ or alcohols. The carbon dioxide may be obtained from gas recycled from the biofractionation process 420, the separation process 480, the syngas conversion to fuels process 460, or external source 431.

Any one combination of $CH_4$, $H_2O$, $CO_2$ and $O_2$ may be also be used to react with the BMF char to create synthesis gas reaction products, including oxygenates such as aldehydes, ethers, esters, alcohols, and carboxylates. The following lists the possible combinations in relation to reactions involving BMF char and a methane stream:

$$C+CH_4+O_2$$

$$C+CH_4+H_2O$$

$$C+CH_4+CO_2$$

$$C+CH_4+H_2O+O_2$$

$$C+CH_4+CO_2+O_2$$

$$C+CH_4+H_2O+CO_2$$

$$C+CH_4+O_2+H_2O+CO_2$$

In these cases, proper channeling of reactants is required to minimize formation of carbon dioxide as given in equations 6 and 7.

In one embodiment, the preferred temperature range for the BMF char reactions listed above is in the range of 800° C. to 1100° C., and most preferably 850° C. to 1050° C. The synthesis gas produced is used in process 77 for a wide variety of purposes. It may be converted into oxygenates and hydrocarbons via a number of different catalytic processes, including methanol synthesis processes, Fischer-Tropsch chemistry, and synthesis gas fermentation. The synthesis gas may also be directly combusted. The hydrogen may be separated from the carbon monoxide and used as feedstock for the ammonia synthesis process or as a reactant in fuel cells. The BMF char may also be combined at any stage after its formation with typical chars.

Adjustment of H2/CO Ratio in BMF Char Reactions

The reactions above may occur concurrently or sequentially in one or several reactors. It is understood that best practice entails careful monitoring of reactant concentrations and of reaction products to adjust the output ratios of hydrogen to carbon monoxide. It should be noted that there is no catalyst involved as typical processes that rely on water gas shift catalysts. The BMF char is a sacrificial agent for the ultimate production of hydrocarbons, in essence representing a more efficient use of the biomass. Temperature, pressure and space velocity will affect the results and distribution of synthesis gas products. The hydrogen to carbon monoxide ratio can be varied depending on the nature of feedstock and quantity of material. Indeed, a stream can be engineered to produce a stream comprising of 100% hydrogen, or one of 100% carbon monoxide, or any compositional mixture of the two. Thus a feedstock comprised exclusively of methane can provide a source of pure hydrogen, while a feedstock comprised of oxygen can provide a source of pure carbon monoxide. The two sources can then be mixed in any ratio. A $H_2/CO$ 2:1 ratio is preferable for the methanol production while dimethyl ether requires a 1:1 ratio.

Another method of adjusting ratio is to utilize a wider range of reactants. A wide range of $H_2/CO$ ratios can be obtained from using different combinations of reactants, chosen from methane, oxygen, water and carbon dioxide. The actual ratios will depend on the chemical equilibrium of all species, which is determined by temperature, pressure, and concentration of reactants and products. As mentioned above, energy for some of the BMF char reactions can be derived either from external or internal sources. External sources refer to energy supplied in the form of recycled waste heat, or waste heat or electricity coming from outside the system described by the present invention. Internal sources refer to energy channeled from the exothermic reactions, such as shown in equations [4] and [5].

Thermal management via internal energy sources may be achieved with the appropriate combination of reactants to render the synthesis gas formation close to energy neutral.

FIG. 6 shows a block diagram of an embodiment of the present invention in which synthesis gas generation arises out of cellulose decomposition and biochar conversion, and subsequent feeding of converted synthesis gas to the fuel product line. An optional methane feed is provided for greater control of the synthesis gas ratio.

Systems Using Present Invention

Figure 14:
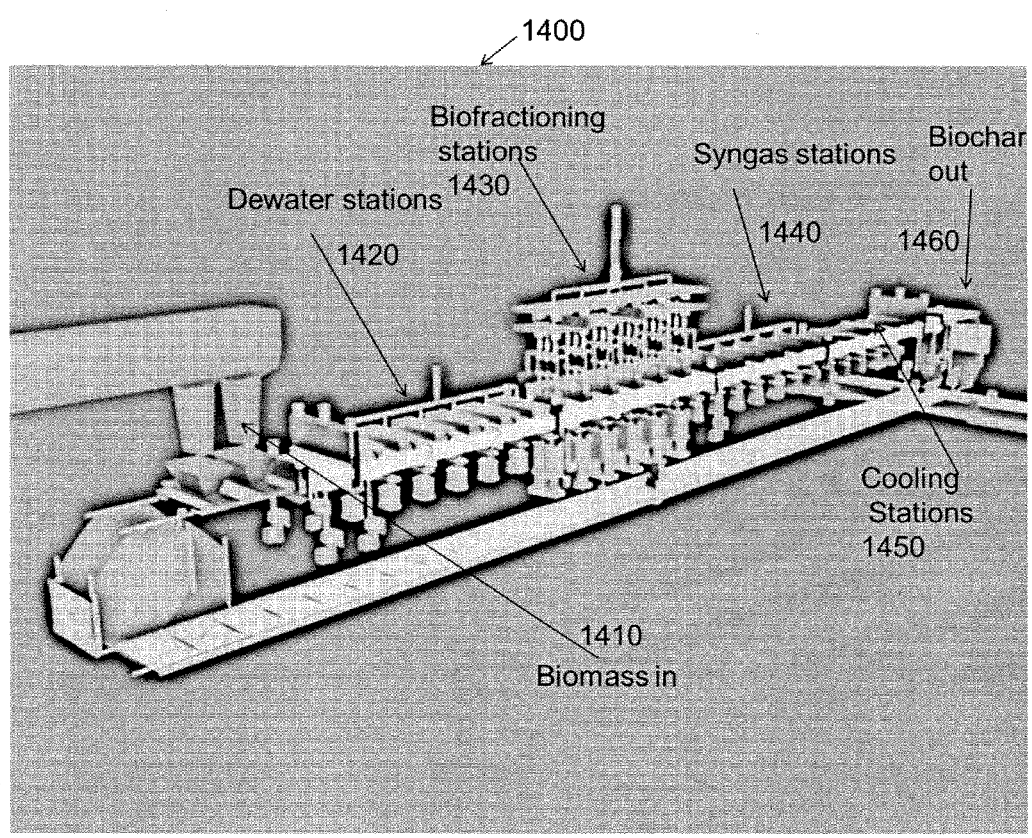
FIG. 14 is an illustration of an embodiment of a system capable of producing negative carbon fuel.
Figure 15:
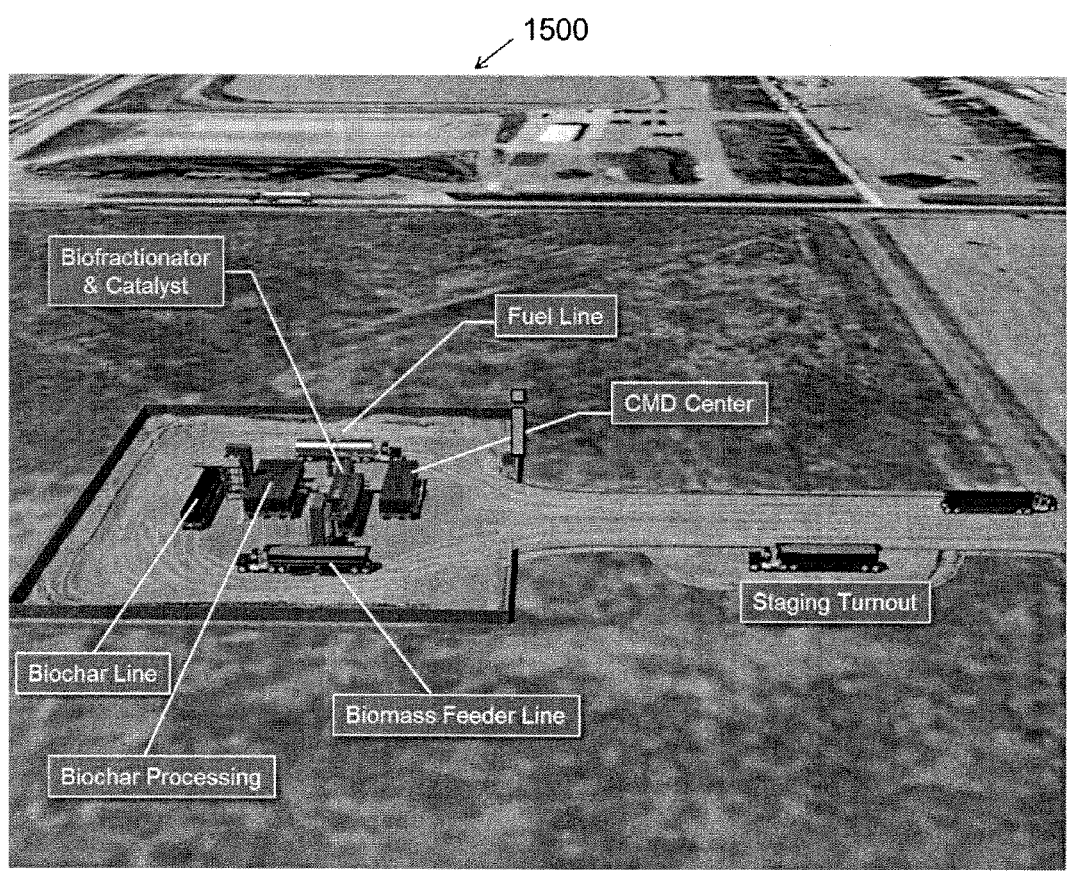
FIG. 15 is an illustration of an embodiment of a system capable of executing various methods of the present invention using mobile equipment.

Processes 410, 420, and 470 in FIGS. 4 and 5 can be carried out on a small enough scale to minimize transport costs of biomass to the reactor site. An embodiment of a system 1400 that executes basic processes of the present invention in one machine running a conveyor line as shown in FIG. 14. This system 1400 comprises hoppers 1410 for biomass dispensation, dewatering stations 1420, biofractioning stations 1430, synthesis gas stations 1440, cooling stations 1450, and a station 1460 for removing biochar from machine onto another conveyor belt. This system can be placed on semi-tractor trailer truck for transport to other locations. An illustration of a larger processing facility 1500 is shown in FIG. 15. One individual trailer houses equipment for an individual process such as biomass pretreatment, biofractionating, fuel conversion including separation and blending, and biochar processing including synthesis gas conversion. A command center is also shown.

ILLUSTRATIVE EXAMPLE

The following example describes an embodiment of the invention. 100 g of wood chips are brought to a pyrolysis process in nominally dry form. Further drying removes 10 g of water. 90 g of wood chips represents 45 g of carbon input to the process. 60 g of methanol are added as co-feed, representing 22.5 g carbon co-fed into the process. The water removal takes 30 KJ of external energy, which represents approximately 2.1 g $CO_2$ (0.6 g carbon) emissions from a natural gas thermal process. Other steps in the pyrolysis and conversion processes consume external energy that amounts to 15 g $CO_2$ (4 g carbon) emissions. The pyrolysis and conversion processes produce 36.1 g of fuel total (32.5 g carbon), and 34 g of sequesterable biochar in separate and uncontaminated form. An additional 3.7 g $CO_2$ (1 g carbon), which is produced within the biofractionation process, is vented out. Following the procedure in FIG. 11, the 34 g of sequesterable carbon is greater than the non-biomass carbon inputs (22.5 g+0.6 g+4 g), and consequently the fuel produced from this process is negative carbon. Per the earlier definition of variable N, the fuel can be labeled N105.

In terms of the carbon dioxide balance, the wood chips removed 165 g of $CO_2$ from the atmosphere via photosynthesis and 119.2 g of $CO_2$ were released back into the atmosphere from burning fuel in a vehicle. Energy for drying wood, process energy and process venting contributed to 20.8 g $CO_2$ emissions to the atmosphere. Energy inputs from other sources are not included. A net of 25.0 g of $CO_2$ was removed from the atmosphere.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. These illustrations and their accompanying description should not be construed as mandating a particular architecture or configuration.

The invention claimed is:

1. A method for making negative carbon fuel and sequesterable carbon from a carbon-containing input, comprising:
   concurrently converting a carbon-containing input to: (a) combustible fuels, refinery feedstock or chemicals; and (b) sequesterable carbon free of hydrophobic hydrocarbons;
   wherein the combustible fuels, refinery feedstock or chemicals arise in separate form from the sequesterable carbon.

2. The method of claim 1, wherein converting the carbon-containing input comprises subjecting the input to ramps of temperatures and pressure shocks.

3. The method of claim 1, wherein at least some of the sequesterable carbon is reacted with oxygen, carbon dioxide, methane or steam to generate synthesis gas, and wherein the synthesis gas is converted to combustible fuels, refinery stock or chemicals.

4. The method of claim 1, further comprising blending the combustible fuels, refinery stock, or chemicals with one or more of: gasoline, diesel, jet fuel, kerosene, light naphtha, heavy naphtha, light cycle oil, and heavy cycle oil.

5. The method of claim 4, further comprising blending the combustible fuels, refinery stock, or chemicals with one or more of: methanol, ethanol, propanol, isopropyl alcohol, n-butanol, t-butanol, pentanol, hexanol, butanediol, dimethyl ether, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), and diisopropyl ether (DIPE).

6. The method of claim 4, further comprising blending the combustible fuels, refinery stock, or chemicals with one or more of: detergent, combustion improver, cetane improver, emulsifier, antioxidant, antifoam agent, corrosion inhibitor, wax crystal modifier, icing inhibitor, lubricity agent and distillate flow improver.

7. The method of claim 3, wherein converting the carbon-containing input comprises subjecting the input to ramps of temperatures and pressure shocks.

8. The method of claim 3, further comprising blending the combustible fuels, refinery stock, or chemicals with one or more of: gasoline, diesel, jet fuel, kerosene, light naphtha, heavy naphtha, light cycle oil, and heavy cycle oil.

9. The method of claim 8, further comprising blending the combustible fuels, refinery stock, or chemicals with one or more of: methanol, ethanol, propanol, isopropyl alcohol, n-butanol, t-butanol, pentanol, hexanol, butanediol, dimethyl ether, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), and diisopropyl ether (DIPE).

10. The method of claim 8, further comprising blending the combustible fuels, refinery stock, or chemicals with one or more of: detergent, combustion improver, cetane improver, emulsifier, antioxidant, antifoam agent, corrosion inhibitor, wax crystal modifier, icing inhibitor, lubricity agent and distillate flow improver.

11. The method of claim 4, wherein converting the carbon-containing input comprises subjecting the input to ramps of temperatures and pressure shocks.

12. The method of claim 4, wherein at least some of the sequesterable carbon is reacted with oxygen, carbon dioxide, methane or steam to generate synthesis gas, and wherein the synthesis gas is converted to combustible fuels, refinery stock or chemicals.

13. The method of claim 1, wherein concurrently converting a carbon-containing input to: (a) combustible fuels, refinery feedstock or chemicals; and (b) sequesterable carbon free of hydrophobic hydrocarbons comprises:
    converting a carbon-containing input to: (a) combustible fuels, refinery feedstock or chemicals; and (b) sequesterable carbon free of hydrophobic hydrocarbons; and
    subjecting the sequesterable carbon to a temperature in excess of about 700° C.

* * * * *